United States Patent [19]
Hamai et al.

[11] Patent Number: 6,031,959
[45] Date of Patent: Feb. 29, 2000

[54] TELEVISION SIGNAL RECORDING AND REPRODUCING APPARATUS

[75] Inventors: Shinji Hamai, Osaka; Masazumi Yamada, Moriguchi; Tatsuro Juri, Osaka; Masakazu Nishino, Kashiwara; Shiro Kato, Hirakata; Akira Iketani, Higashiosaka; Chiyoko Matsumi, Suita, all of Japan

[73] Assignee: Matsushita Electric Industrial Co., Ltd., Osaka, Japan

[21] Appl. No.: 08/766,644

[22] Filed: Dec. 13, 1996

Related U.S. Application Data

[62] Division of application No. 08/309,207, Sep. 20, 1994, abandoned.

[30] Foreign Application Priority Data

| Sep. 20, 1993 | [JP] | Japan | P05-232916 |
|---|---|---|---|
| Oct. 21, 1993 | [JP] | Japan | P05-263311 |
| Nov. 16, 1993 | [JP] | Japan | P05-286565 |
| Nov. 17, 1993 | [JP] | Japan | P05-287936 |
| Nov. 18, 1993 | [JP] | Japan | P05-289012 |
| Feb. 18, 1994 | [JP] | Japan | P06-021039 |

[51] Int. Cl.⁷ ............................. H04N 5/76; H04N 5/783
[52] U.S. Cl. ................................. 386/68; 386/95; 386/111
[58] Field of Search ............................. 386/68, 81, 111, 386/112, 109, 46, 95, 96, 80, 75, 82, 124, 120, 121; H04N 5/76, 5/783

[56] References Cited

U.S. PATENT DOCUMENTS

| 4,868,654 | 9/1989 | Juri et al. | 348/424 |
|---|---|---|---|
| 5,097,348 | 3/1992 | Suetaka | 358/335 |
| 5,097,364 | 3/1992 | Goto et al. | 386/124 |
| 5,353,059 | 10/1994 | Lawlor et al. | 358/336 |
| 5,400,315 | 3/1995 | Koishi et al. | 358/310 |
| 5,450,209 | 9/1995 | Niimura et al. | 358/335 |
| 5,568,328 | 10/1996 | Takahashi et al. | 386/112 |
| 5,623,344 | 4/1997 | Lane et al. | 386/81 |
| 5,727,113 | 3/1998 | Shimoda | 386/48 |
| 5,786,955 | 7/1998 | Kori et al. | 386/121 |

FOREIGN PATENT DOCUMENTS

| 0 353 758 | 2/1990 | European Pat. Off. |
|---|---|---|
| 0505985 | 9/1992 | European Pat. Off. |
| 0522869 | 1/1993 | European Pat. Off. |
| 0553949 | 8/1993 | European Pat. Off. |
| 0554078 | 8/1993 | European Pat. Off. |
| 0596527 | 5/1994 | European Pat. Off. |
| 0 613 297 | 8/1994 | European Pat. Off. |
| 0 632 653 | 1/1995 | European Pat. Off. |
| 2265047 | 9/1993 | United Kingdom. |
| 94/17631 | 8/1994 | WIPO. |

OTHER PUBLICATIONS

J. Boyce et al., "Fast Scan Technology for Digital Video Tape Recorders", *IEEE Transactions on Consumer Electronics*, vol. 39, No. 3, pp. 186–191 (Aug. 1993).

C. Yamamitsu et al., An Experimental Study on Home–Use Digital VTR:, WPM 8.6, *IEEE*, pp. 122–123 (1989).

*Primary Examiner*—Huy Nguyen
*Attorney, Agent, or Firm*—Ratner & Prestia

[57] ABSTRACT

The video signal input is converted to high-speed reproduction data by a high-speed reproduction data encoder 1. The video signal input is converted to high-speed reproduction data by a formatter 2, which formats the high-speed reproduction data so that the same data is recorded to n tracks. After the recorded data is input to an error correction encoder 3, it is decoded by a decoder 4 and recorded by a recording head 5 to the magnetic tape 6. During reproduction, the recorded data is reproduced by reproduction head 7 from the magnetic tape 6, and decoded by decoder 8. The decoded data is then error corrected by an error correction decoder 9, and then input to a deformatter 10. The deformatter 10 separates the normal reproduction data from the high-speed reproduction data, and separately outputs both data types. During normal reproduction, the normal reproduction data is output by a switch 13; the high-speed reproduction data is decoded to video data by a high-speed reproduction data decoder during high speed reproduction, and output.

26 Claims, 21 Drawing Sheets

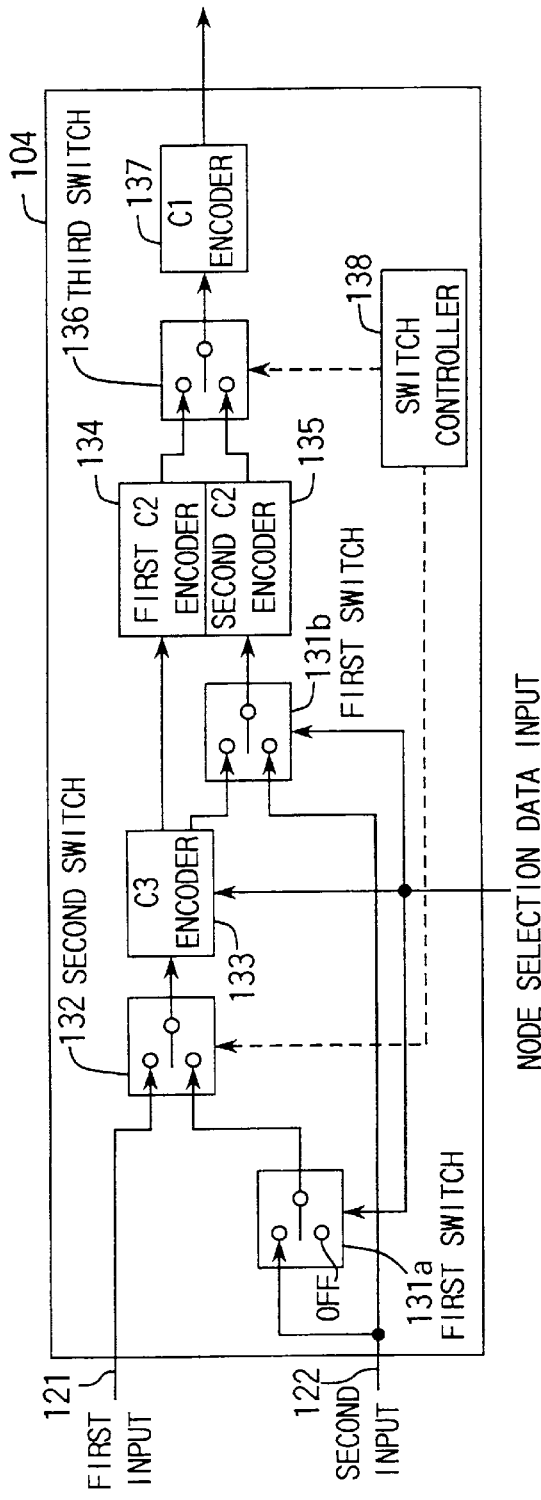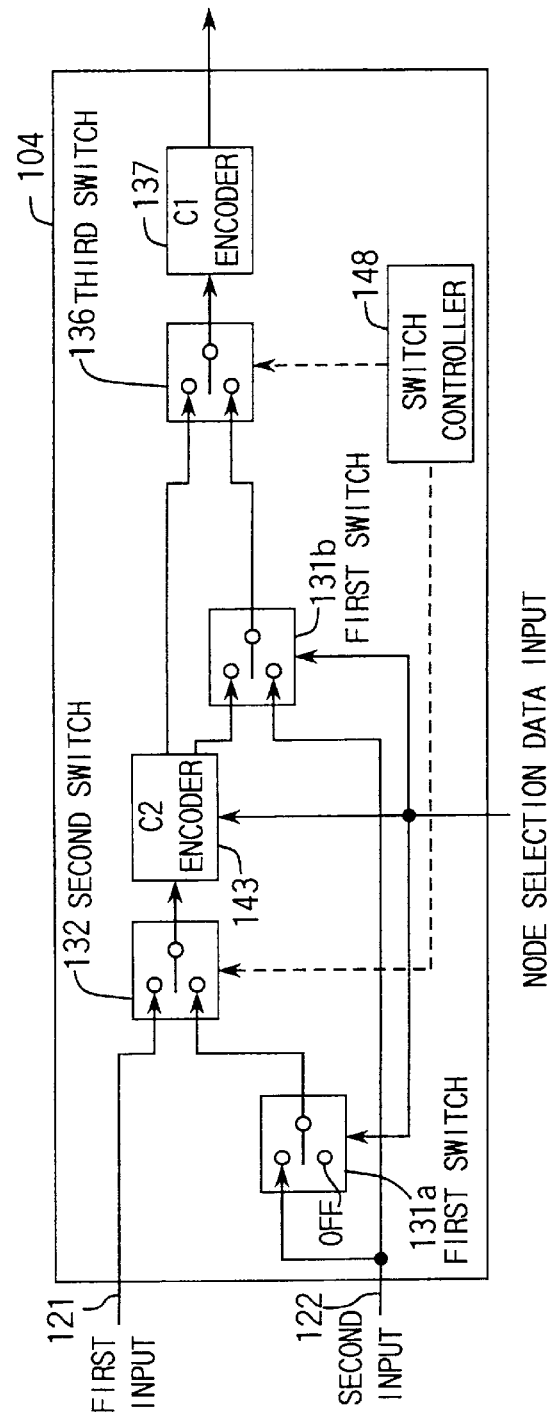

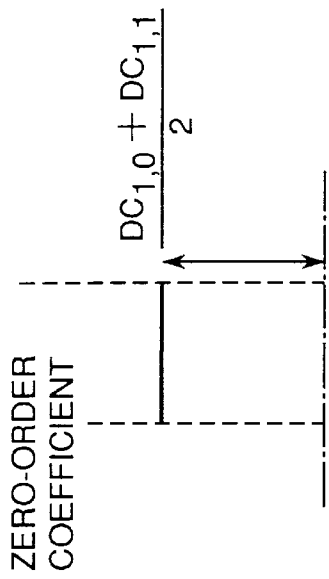
Fig.21A
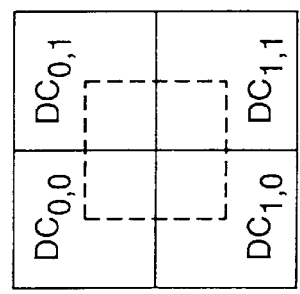
Fig.21B
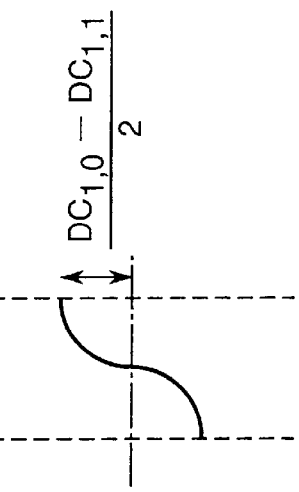
Fig.21C ORTHOGONAL TRANSFORMATION COEFFICIENT
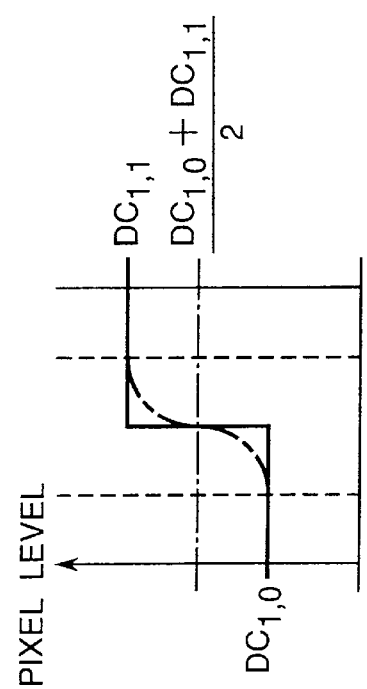
Fig.21D 1ST-ORDER COEFFICIENT

| $DC_{1,-1}$ | $DC_{0,-1}$ | $DC_{1,-1}$ |
| --- | --- | --- |
| $DC_{-1,0}$ | $DC_{0,0}$ | $DC_{1,0}$ |
| $DC_{-1,1}$ | $DC_{0,1}$ | $DC_{1,1}$ |

TELEVISION SIGNAL RECORDING AND REPRODUCING APPARATUS

This application is a division of application Ser. No. 08/309,207 filed Sep. 20, 1994 abandoned.

BACKGROUND OF THE INVENTION

1. Field of the Invention

The present invention relates to a recording and reproducing apparatus, and particularly to a digital video cassette recorder (VCR).

2. Description of the Prior Art

Most VCRs available today using analog recording, but the image deterioration resulting during recording, reproducing, and particularly dubbing with analog VCRs has heightened interest in digital recording VCRs.

An example of a common consumer digital VCR is described in the ICCE Digest of Technical Papers, June 1989, 6–9.

VCRs today also use helical recording, a recording/reproducing method whereby heads are mounted on a cylinder positioned at an angle to the perpendicular and rotating at high speed, and the magnetic tape is transported while wrapped by a loading post to the cylinder.

Tracks are recorded in this helical recording method by the movement of the magnetic tape and the rotation of the heads.

The recorded television signal is often compressed to reduce the amount of data recorded. Intra-frame compression is generally used for the video signal due in order to enable image editing, but inter-frame compression methods, which obtain the difference between the current intra-frame compressed image and the images before and after, have been recently established (e.g., MPEG compression).

The conventional recording method described above, however, cannot be easily applied to recording and reproducing inter-frame compressed video signals. For example, significant image degradation occurs when errors occur during reproduction. More specifically, in coding methods using inter-frame compression, if the current image (frame) (the image referenced to obtain the difference from the before and after images) is disrupted, the deterioration in image quality will extend across several following frames; if the intra-frame compressed area is disrupted due to a signal error, the frames interpolated based on that image area will be severely disrupted.

Gaps may also appear in the data when an error occurs during reproduction and during high-speed reproduction, and data duplication may occur during slow reproduction modes and when reproducing tapes to which the data is recorded plural times.

The data compression decoder is able to decode and reproduce the signal during normal reproduction modes, but is unable to function normally during high-speed reproduction and when data is lost or duplicated due to an error, and in the worst case scenario may not be able to decode the video signal.

SUMMARY OF THE INVENTION

Therefore, an object of the present invention is to provide a recording and reproducing apparatus for minimizing image deterioration by modifying the data compression decoder to accept the data even when data loss or duplication occurs.

In addition, reproducing all recorded data is impossible during high-speed reproduction, and image quality therefore deteriorates. In other words, because the magnetic tape travels at high speed during high-speed reproduction, the reproducible data spans plural image frames, the screen is refreshed sequentially instead of simultaneously, and the displayed image quality therefore deteriorates.

Particularly when the video signal is recorded with variable length coding, the position of the data on magnetic tape and the position of the image on screen do not correspond, and the screen refresh sequence is therefore not constant during high-speed reproduction. As a result, there will be pixels on screen that are not refreshed, and image quality necessarily deteriorates.

In addition, reproducing the screen from an inter-frame compressed signal requires the data of the intra-frame compressed image that is the basis for obtaining the difference signals, but this data cannot be reliably reproduced during high-speed reproduction with methods that record inter-frame compressed video signals. When reproducing inter-frame compressed video signals, it is therefore only possible to reproduce the intra-frame compressed video data in the data read from tape during high-speed reproduction. It is not possible at this time to restore all of the read data to the original video signal form.

Another object of the invention is therefore to provide a recording and reproducing apparatus providing excellent image quality even during high-speed reproduction modes.

As will be described below in the descriptions of preferred embodiments, when the data important to this invention is the DC component only, a flat image results using only the average value of each block, and image quality deterioration increases.

A further object of the invention is to provide a recording and reproducing apparatus whereby the data compression decoder corrects the data so that the image block is not reproduced flat even when only the DC component is input, and thereby improves image quality when errors occur and during high-speed reproduction.

It is also possible that the transmitted compressed television signals will be compressed at different rates, but conventional devices have only been able to handle a single compression rate. In addition, the presence and capacity of other signals related to the input signal can be expected to vary, and conventional devices have also only been able to handle a predetermined, fixed signal capacity.

Furthermore, if the recording capacity is variable, the error correction capacity of the error correction code becomes a problem. For example, when a signal with a higher data rate is input, and data that should be recorded to the main area overflows and is recorded to a subarea, the error correction capacity of the error correction code used in the subarea is less than the error correction capacity of the error correction code used in the main area, and there is no guarantee that the data recorded to the subarea can be correctly reproduced.

Therefore, a further object of this invention is to provide a recording and reproducing apparatus for recording compressed video signals of various data rates and with different capacities for related signals.

To achieve the aforementioned objects, a recording and reproducing apparatus according to a first aspect of the invention comprises:

a related signal extraction means for extracting related signals, which are signals related to compressed television signals comprising compressed video and audio signals; and a recording means for recording the output of the related signal extraction means, information related to said output, and the compressed television signal.

A recording and reproducing apparatus according to a second aspect of the invention comprises:

a reproduction means for reproducing the signals recorded to the recording medium to obtain the reproduction signal;

a first extraction means for extracting the compressed television signal from the reproduction signal;

a second extraction means for extracting information relating to the related signals of the compressed television signal;

a third extraction means for extracting the related signals of the compressed television signal based on the information of the related signals of the extracted compressed television signal; and an output selection means for selecting and outputting either the output of the first extraction means or the output of the third extraction means.

When part of the data is disrupted by an error during data reproduction, it is possible by means of the first and second aspects described above to minimize image deterioration caused by data errors by selecting the extracted related signal data in the same position as the disrupted data, and substituting the selected related signal data for the disrupted data. Extracting the data for the intra-frame compressed area, or extracting this data further compressed as the related signal is particularly effective for preventing error propagation.

A recording and reproducing apparatus according to a third aspect of the invention comprises:

a coded position information detection means for obtaining the coded position information, which identifies the position on screen, for each part of the related signal reproduced from the recording medium;

a data deletion means for deleting part of the reproduced related signal so that there is no duplication of data for the same position on screen when there are related signals having parts occupying the same position on screen; and a data sorting means for sequencing the related signals from which data has been deleted by the data deletion means in the order received by the decoding means.

A recording and reproducing apparatus according to a fourth aspect of the invention comprises:

a coded position information detection means for obtaining the coded position information, which identifies the position on screen, for each part of the related signal reproduced from the recording medium;

an unprocessed position detection means for detecting the unprocessed positions, which are the positions not reproduced on screen when the related signals are decoded;

a coded data generating means for generating the coding data used to decode the unprocessed positions, and adding the coding data to the related signals; and a data sorting means for sequencing the related information to which data was added by the coded data generating means in the order received by the decoding means.

By means of the fourth aspect of the invention, image deterioration is minimized when a data loss or duplication occurs in part of the data during reproduction by deleting the duplication or generating data to fill the loss.

A recording and reproducing apparatus according to a fifth aspect of the invention comprises:

an extraction means for extracting the related signals, which are signals related to the compressed television signal; and a formatting means for sequencing the related signals so that the same data is recorded to plural n tracks.

It is possible by means of this aspect to output video with excellent picture quality during high-speed reproduction.

A recording and reproducing apparatus according to a sixth aspect of the invention comprises:

an interpolated image generating means for obtaining an interpolated image signal by interpolating the pixels in each block from the DC components of each block and the surrounding blocks in the related signals reproduced from the recording medium; and a coding means for obtaining a coded interpolation signal by coding the interpolated image signal to a signal state that can be decoded by the decoding means.

A recording and reproducing apparatus according to a seventh aspect of the invention comprises:

an interpolated image conversion coefficient generating means for obtaining an orthogonal transformation coefficient by applying an orthogonal transform to the interpolated image signal, which is obtained by interpolating the pixels in each block from the DC components of each block and the surrounding blocks in the related signals reproduced from the recording medium; and a coding means for obtaining a coded interpolation signal by coding the interpolated image conversion coefficient to a signal state that can be accepted by the decoding means.

A recording and reproducing apparatus according to an eighth aspect of the invention comprises;

an interpolated image coding signal recording means for relating the values of the DC components of each block and the surrounding blocks to the interpolated image coding signal, and pre-recording the relationship information; and a coding means for obtaining a coded interpolation signal equivalent to the coded signal of the interpolated images of each block based on the relationship information of the interpolated image coding signal storage means from the DC components of each block and the surrounding blocks in the related signals reproduced from the recording medium.

By means of the sixth, seventh, and eighth aspects of the invention as described above, an interpolated image, the conversion coefficient, or a code word for each block is generated from the DC components of that block and the surrounding blocks and sorted to the format of the composite signal accepted by the decoder. As a result, even when the external decoder is not provided with a smoothing means, the resulting image is the same as though the decoding result is smoothed, and block distortion of the reproduced image can be reduced.

By means of the seventh aspect as described above, the orthogonal transformation coefficient of the current block can be obtained directly from the DC components of the selected block and surrounding blocks using the filter effect of the orthogonal transform when the orthogonal transformation coefficient of the interpolated image in each block is generated from the DC components of each block and the surrounding blocks.

By means of the eighth aspect as described above, the coded signal of the interpolated image of the block can be obtained directly by vector quantization from the DC components of each block and the surrounding blocks when generating the coded signal of the interpolated image of each block from the DC components of each block and the surrounding blocks by storing as a vector quantization code book the correlations between the values of the DC components of each block and the surrounding blocks, and the coded signals of when the interpolated image in each block is coded.

A recording and reproducing apparatus according to a ninth aspect of the invention comprises:

a coding means for obtaining a coded reduced image signal by handling the value of the DC component of each block in the related signals generated from the recording medium as a single pixel value, and coding the reduced image signals by block unit to the signal format accepted by the decoder.

By means of this configuration, the decoder of the ninth aspect of the invention can reproduce reduced images during high-speed reproduction by handling each DC component as a single pixel, coding by block units, and outputting the result to the decoder. Because this reduced image reproduces one block of the normal image as one pixel, the resulting image is smaller than the normally reproduced image, but is sufficient for displaying the content of the normally reproduced image. In addition, there is no image deterioration due to block errors because each block is represented as a pixel and not as a flat block.

A recording and reproducing system according to a tenth aspect of the invention comprises a recording and reproducing apparatus for reproducing a compressed television signal and outputting a coded reproduction signal, and a decoder for obtaining the video signal by decoding the coded reproduction signal.

This decoder comprises:

a decoding means for obtaining a decoded image signal by decoding the coded reproduction signal; and a smoothing means for smoothing the decoded image signal using a low band pass filter.

This recording and reproducing apparatus comprises:

a reproduction means for reproducing the signals recorded to the recording medium to obtain the reproduction signal;

a first extraction means for extracting the compressed television signal from the reproduction signal;

a second extraction means for extracting the information relating to the related signals of the compressed television signal;

a third extraction means for extracting the related signals of the compressed television signal based on the information of the related signals of the extracted compressed television signal;

an output selection means for selecting and outputting either the output of the first extraction means or the output of the third extraction means; and a smoothing request means for outputting to the decoder a smoothing request signal requesting smoothing of the reproduction image using the smoothing means; and is characterized by outputting the smoothing request signal when the output of the third extraction means is selected.

By means of this configuration, the tenth aspect of the invention can reduce block distortion in the reproduced image by smoothing the decoded image using the smoothing means after decoding by the decoder by outputting the smoothing request signal during reproduction of the related information during, for example, high-speed reproduction.

An eleventh aspect of the invention comprises:

a recording control means for varying the recording capacities of a first area, which is used to record a compressed television signal, and a second area, which is used to record the related signals;

a recording means for recording the compressed television signal and related signals based on the output of the recording control means; and a capacity information storage means for storing information relating to the related signals and recording capacities.

The eleventh aspect of the invention further comprises:

a reproduction means for obtaining the reproduction signal by reproducing the signals recorded to the recording medium;

a first extraction means for extracting the capacity information relating to the recording capacity of the first and second areas of the recording medium from the reproduction signal;

a recording capacity calculating means for obtaining the recording capacity information from the output of the first extraction means; and a second extraction means for extracting a first reproduction signal from that part of the reproduction signal recorded to the first area, and extracting a second reproduction signal from that part recorded to the second area, based on the output of the recording capacity calculating means.

By means of this configuration, the eleventh aspect of the invention can record the input signal and related signals using variable recording capacities by varying the rate of the input signal and the rate of the related signals. The variable recording capacity is recorded as capacity information, can be determined during reproduction by extraction, and the input signal and related signals can be separately extracted and reproduced.

A twelfth aspect of the invention comprises at least an error correction coding means for selecting the error correction code used for the recorded data according to the combination of areas assigned to the recorded data.

By means of this configuration, the twelfth aspect of the invention can record data more efficiently than conventional apparatuses by selecting the error correction code used for the recorded data according to the combination of areas assigned to that data.

BRIEF DESCRIPTION OF THE DRAWINGS

The present invention will become more fully understood from the detailed description given below and the accompanying drawings wherein:

FIG. 14 is a block diagram of a first embodiment of the error correction coding means according to the second embodiment of the invention;

FIG. 16 is a block diagram of a second embodiment of the error correction coding means according to the second embodiment of the invention;

FIGS. 21A, 21B, 21C and 21D are explanatory diagrams used to describe the low band component generating method of the third embodiment of the secondary data decoding means according to the present invention;

DESCRIPTION OF PREFERRED EMBODIMENTS

Figure 1:
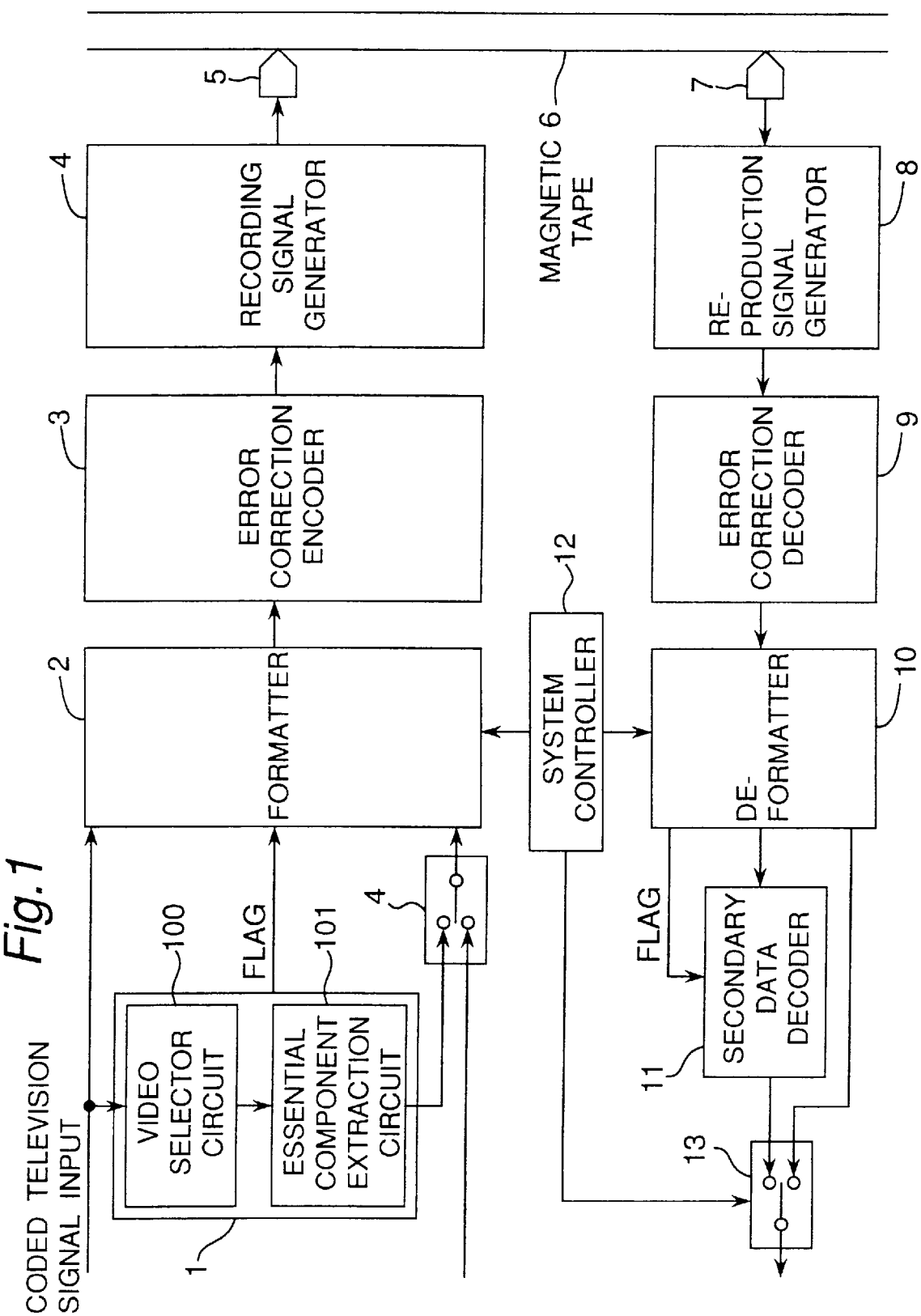
FIG. 1 is a block diagram of the first embodiment of a recording and reproducing apparatus according to the invention.

The first embodiment of a recording and reproducing apparatus according to the invention is described below with reference to the accompanying figures, of which FIG. 1 is a block diagram of a coded television signal recording and reproducing apparatus according to the first embodiment of the invention.

As shown in FIG. 1, a recording and reproducing apparatus according to this embodiment comprises a secondary data generating circuit 1, formatter 2, error correction encoder 3, recording signal generator 4, recording head 5, magnetic tape 6, reproduction head 7, reproduction signal generator 8, error correction decoder 9, deformatter 10, secondary data decoder 11, system controller 12, and switch 13.

The secondary data generating circuit 1 further comprises a video selector circuit 100 and an essential component extraction circuit 101.

Operation during recording is described below.

The coded television signal is first input directly to the formatter 2 and to the secondary data generating circuit 1. In the secondary data generating circuit 1, the video selector circuit 100 selects the intra-frame coded data from the coded television signal. The essential component extraction circuit 101 then extracts the DC component of each block from the selected intra-frame coded data as the secondary data, and outputs this extracted secondary data from the secondary data generating circuit 1 to the formatter 2.

The coded television signal input directly to the formatter 2 is then formatted to a specified track pattern with the secondary data by the formatter 2.

The formatted data is then input to the error correction encoder 3, which adds an error correction code. The recording signal generator 4 then applies any specified recording signal processing, including adding a signal synchronization address and modulation, to the error corrected data to generate a recording signal. The generated recording signal is then recorded by the recording head 5 to the magnetic tape 6.

Depending on the type of television signal input, the formatter 2 can also format the signal so that the secondary data is not included in the recorded signal. During recording, a flag indicating whether the secondary data is recorded or not is generated by the secondary data generating circuit 1, and this flag is recorded to the magnetic tape 6 together with the coded television signal and the secondary data.

By means of this operation, a flag indicating whether or not secondary data is also recorded is recorded with the input coded television signal, and when this flag indicates that the secondary data is also recorded, the secondary data is also recorded to the magnetic tape 6.

Operation during reproduction is described below.

During reproduction, the recorded data is reproduced from the magnetic tape 6 by the reproduction head 7, is processed as required for decoding, synchronization address deletion, and other processes by the reproduction signal generator 8, and the processed data is output as the reproduction signal to the error correction decoder 9. The reproduction signal is error corrected by the error correction decoder 9, and is then output to the deformatter 10.

The deformatter 10 first reproduces the flag indicating whether there is any secondary data or not; when this flag indicates that there is secondary data, the deformatter 10 separates and separately outputs the input coded television signal and secondary data.

When present, the secondary data is then expanded to the same format as the input coded television signal.

The coded television signal and expanded secondary data are switched each frame by the switch 13. Switching is controlled by the system controller 12 and occurs when data loss or errors are likely to occur, such as during high-speed reproduction modes. By switching the switch 13 so that the output of the secondary data decoder 11 is selected in such cases even when drop-out or an error occurs in the intra-frame compressed data of the recorded coded television signal, it is possible to interpolate and restore the data for the same area from the secondary data.

Switching does not occur when the flag read by the deformatter 10 indicates that essential component data is not recorded.

The signal selected and output by the switch 13 is then output to the decoder as the reproduced coded television signal.

As result, it is possible to prevent gaps in the image and minimize image deterioration by switching to and substituting the extracted data as the secondary data even when there are errors during reproduction or data loss occurs such as during picture search modes. This also makes it possible to minimize error propagation to the following frames.

When secondary data is not recorded, this is indicated by the flag and switching does not occur; any wrong data is therefore not mistakenly output as the secondary data, and reproduction errors during decoding are thereby prevented. Whether or not this substitution occurs is determined by evaluating, for example, the presence of essential components; flags indicating, for example, the data type; and error occurrence and frequency.

The track pattern formed by the formatter 2 is described next with reference to FIGS. 2–8.

In the description below, the time required to record one frame image during normal reproduction modes is referred to as "one frame period"; an area on the magnetic tape required to record one frame image is referred to as "one frame interval."

Figure 2:
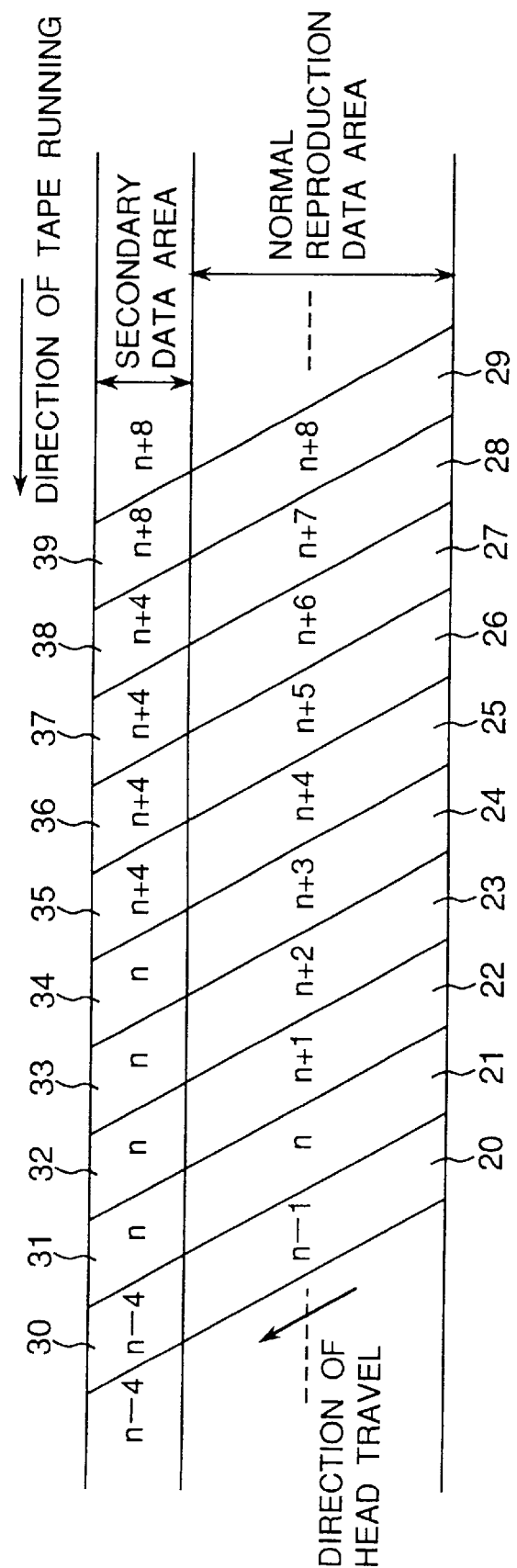
FIG. 2 is a diagram of the track pattern recorded by the recording and reproducing apparatus according to the invention.

Referring to FIG. 2, areas 30–39 are the secondary data areas, and areas 20–29 are the normal reproduction data areas. The secondary data is thus recorded to secondary data areas 30–39, and the input coded television signal is recorded to normal reproduction data areas 20–29.

During recording, the coded television signal for one frame is recorded to one normal reproduction data area. For example, if the data for the frame at time n is recorded to normal reproduction data area 21, the data for the frame at time n+1 is recorded to normal reproduction data area 22, the data for the frame at time n+2 is recorded to normal reproduction data area 23, the data for the frame at time n+3 is recorded to normal reproduction data area 24, and the data for the frame at time n+4 is recorded to normal reproduction data area 25.

The secondary data is similarly recorded to the secondary data areas, but because the tape speed is faster during high-speed reproduction than during normal reproduction, more frame intervals are reproduced during high-speed reproduction than during normal reproduction within the same one frame period. For example, if the tape speed during high-speed reproduction is four times as fast as the normal tape speed (4× normal tape speed), then four times as many frame intervals are reproduced during one frame period as are reproduced during normal (1× tape speed) reproduction.

As a result, the secondary data of frame n is divided into four parts and recorded to the secondary data areas 31–34 of four frame intervals used for high-speed reproduction (one high-speed reproduction area). In the next high-speed reproduction area, the secondary data of frame n+4 is divided into four parts and recorded to secondary data areas 35–38. This pattern is repeated thereafter.

Figure 3:
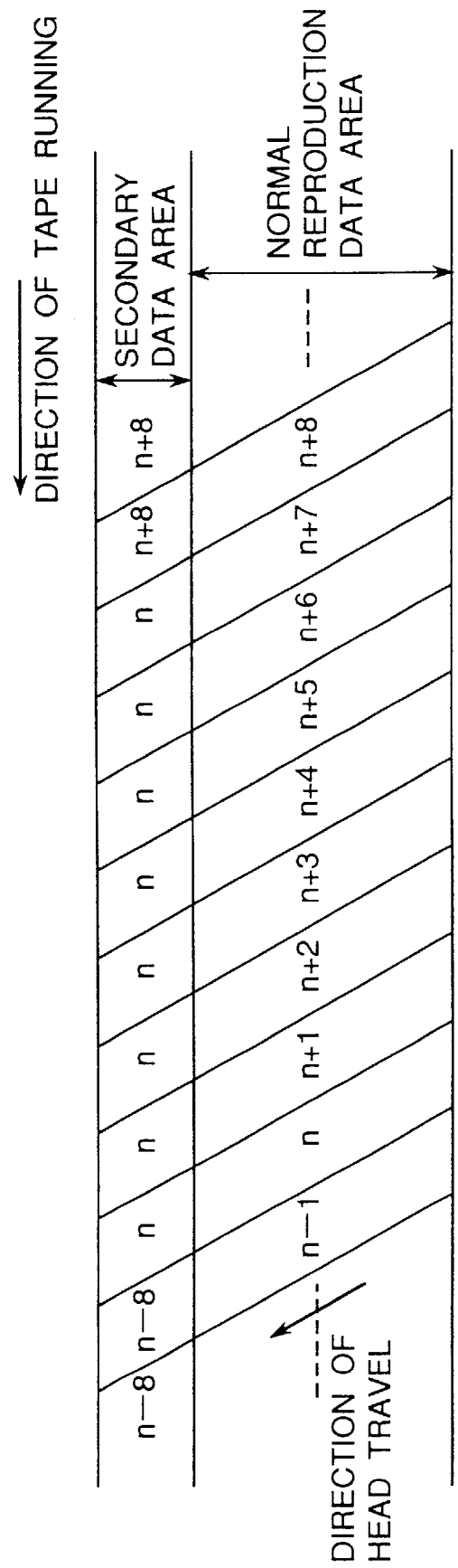
FIG. 3 is another diagram of the track pattern recorded by the recording and reproducing apparatus according to the invention.

When the secondary data is too large to record the secondary data for one frame to one high-speed reproduction area of four frame intervals, the secondary data for one frame is recorded to two high-speed reproduction areas, i.e., eight frame intervals, as shown in FIG. 3. In this case, the video of one frame can be reproduced in two frame intervals during high-speed reproduction. While the refresh period is doubled, it is still possible to refresh one complete frame at a time.

Figure 4:
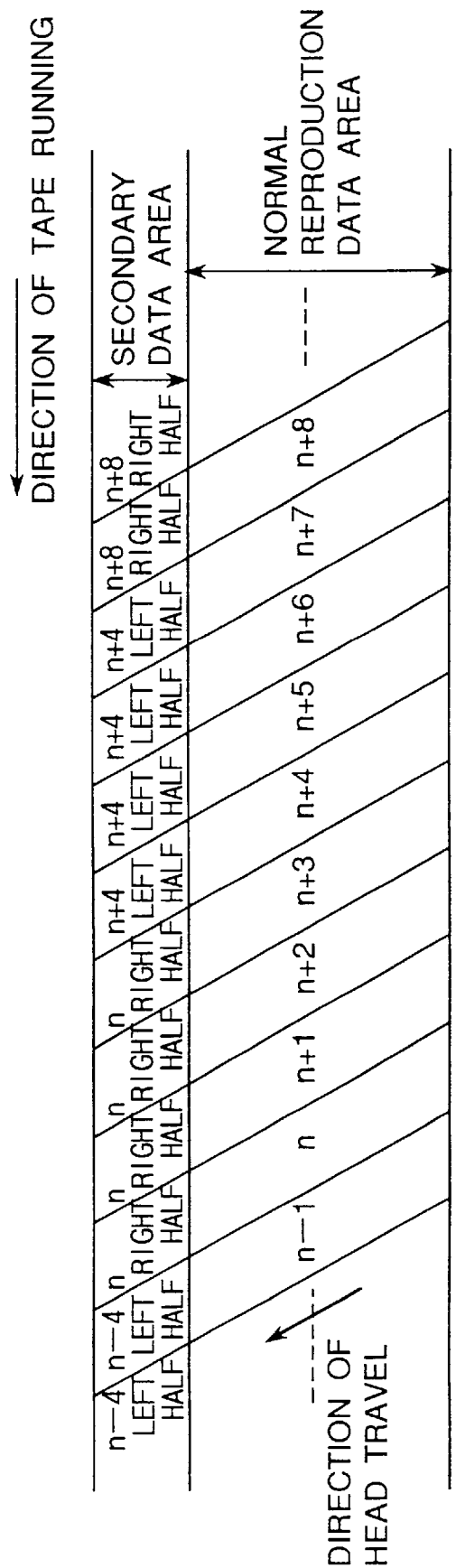
FIG. 4 is a further diagram of the track pattern recorded by the recording and reproducing apparatus according to the invention.

Alternatively, as shown in FIG. 4, it is possible to reproduce half of the image for one frame during one frame interval by recording half of one frame to the high-speed reproduction area of four frame intervals and recording the other half of the frame to the next high-speed reproduction area of four frame intervals; e.g., recording the right half of the on-screen frame to the first high-speed reproduction area, and recording the left half to the next high-speed reproduction area.

Figure 5:
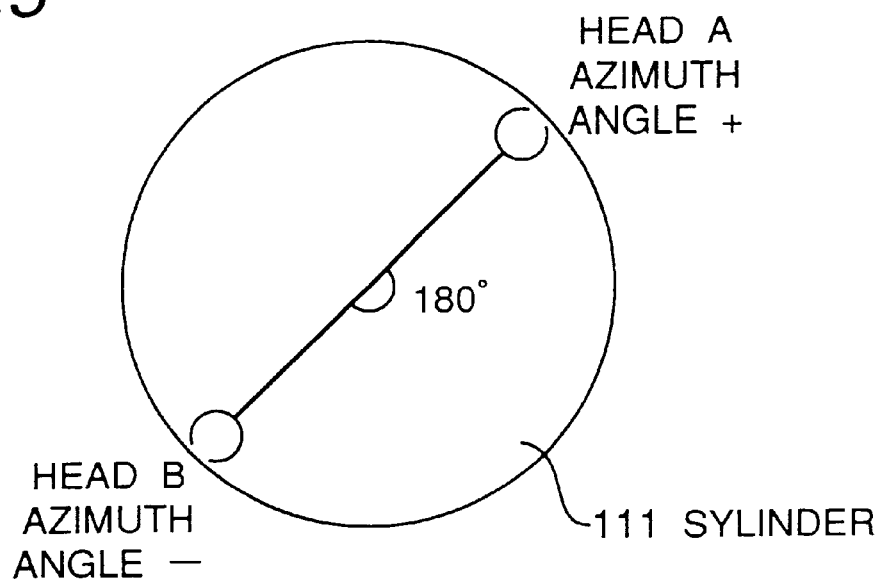
FIG. 5 is a diagram showing an arrangement of heads used in the recording and reproducing apparatus according to the invention.
Figure 7:
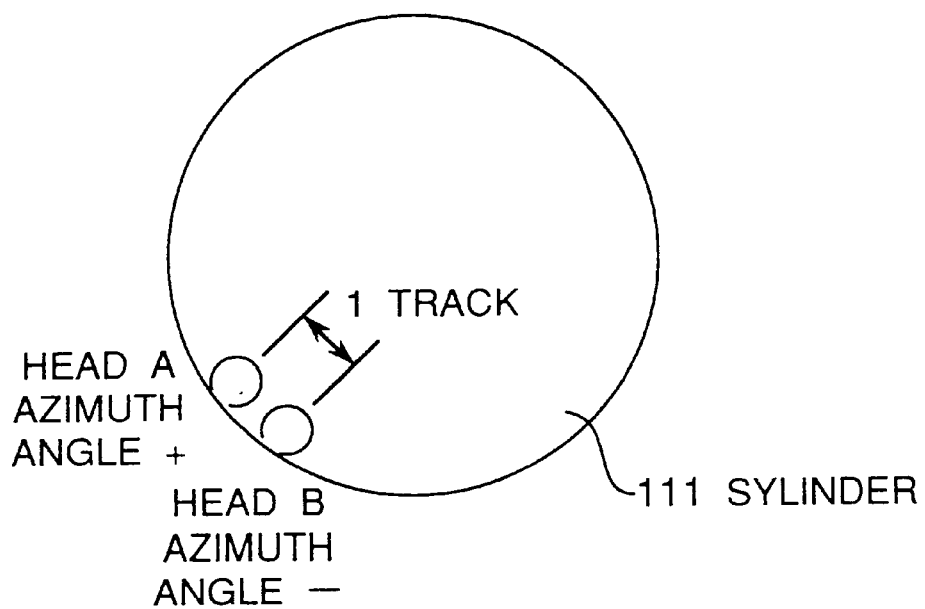
FIG. 7 is a diagram showing an alternative arrangement of heads used in the recording and reproducing apparatus according to the invention.
Figure 6:
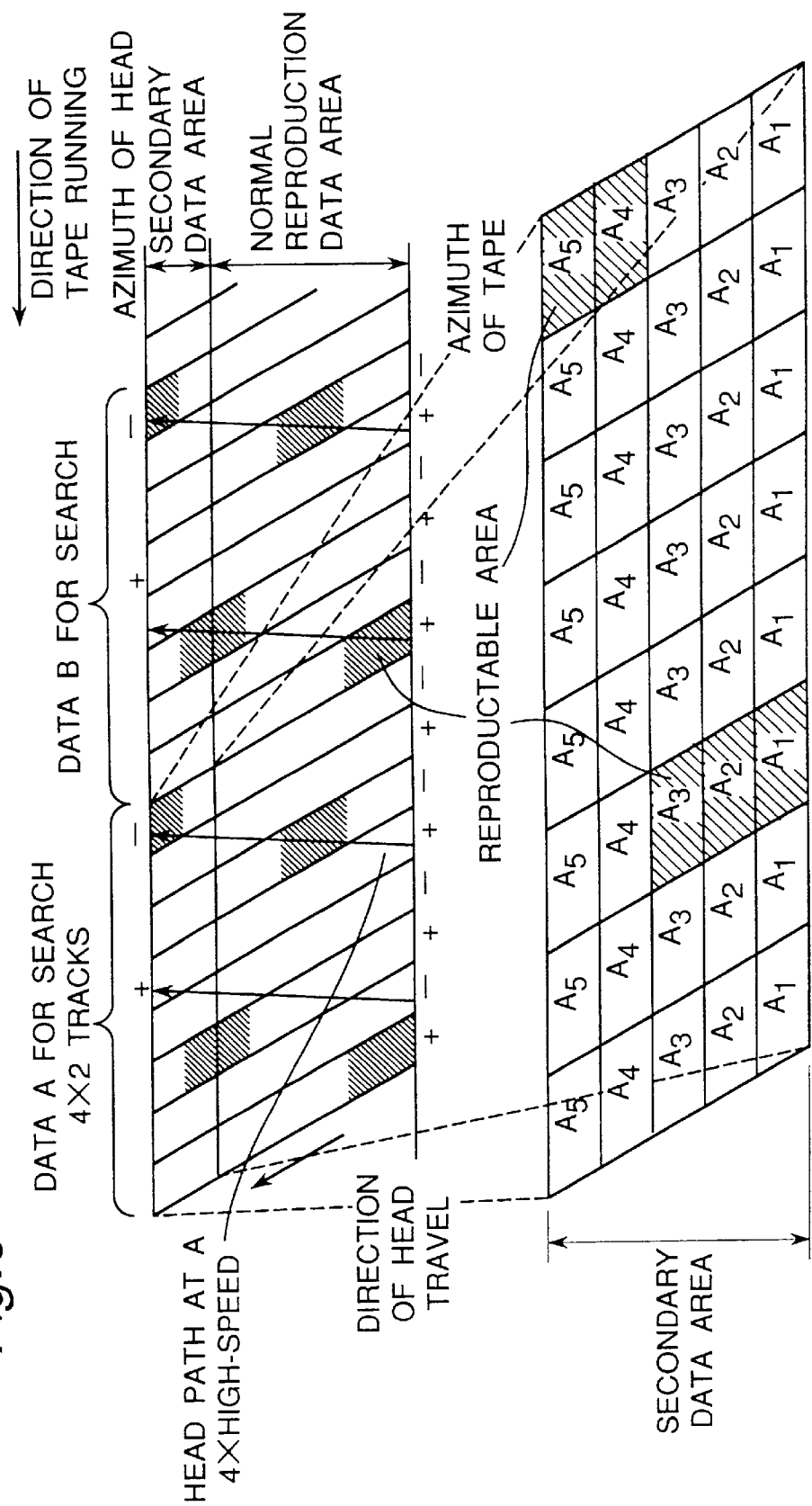
FIG. 6 is a diagram of the track pattern recorded by the heads arranged as shown in FIG. 5 according to the invention.

The head configuration shown in FIG. 5 is considered below. In this configuration, two heads are placed 180° apart with opposite azimuth angles. When the cylinder rotates one revolution when the tape speed is four times the normal tape speed with this configuration, the head path will be as shown in FIG. 6; the shaded areas are the areas that can be reproduced at this time. Because the azimuth angles remain opposite with any even multiple of the tape speed, the areas that can be reproduced by heads A and B will differ. Therefore, if the same data is recorded repeatedly to a constant part of the track, one of the heads will always be able to reproduce this data. Because heads A and B complement each other for data reproduction, the same data may be recorded during a single scan period. With the head configuration in FIG. 5, this requires twice the number of tracks of the high-speed reproduction speed, or eight tracks during 4× reproduction. It is therefore possible to reliably reproduce the data during operation at an even multiple of the normal tape speed within the interval covered by one rotation of the cylinder by recording the same data to the high-speed reproduction area, e.g., to 2n tracks when recording at n-times the normal tape speed. This is possible even if the head paths are different.

By recording with this track pattern, it is possible to easily control the heads and magnetic tape during high-speed reproduction.

In FIG. 6, the same data (A1, A2, A3, A4, and A5 is recorded to eight (=4×2) tracks. If the tape is then reproduced at a 4× high-speed reproduction mode, heads A and B reproduce these areas one at a time. With this data format, A1, A2, and A3 can be reproduced by head A, and A4 and A5 can be reproduced by head B assuming a head path as shown in FIG. 6.

By recording data with this track pattern, it is also possible to determine in advance what data can be reproduced.

Figure 8:
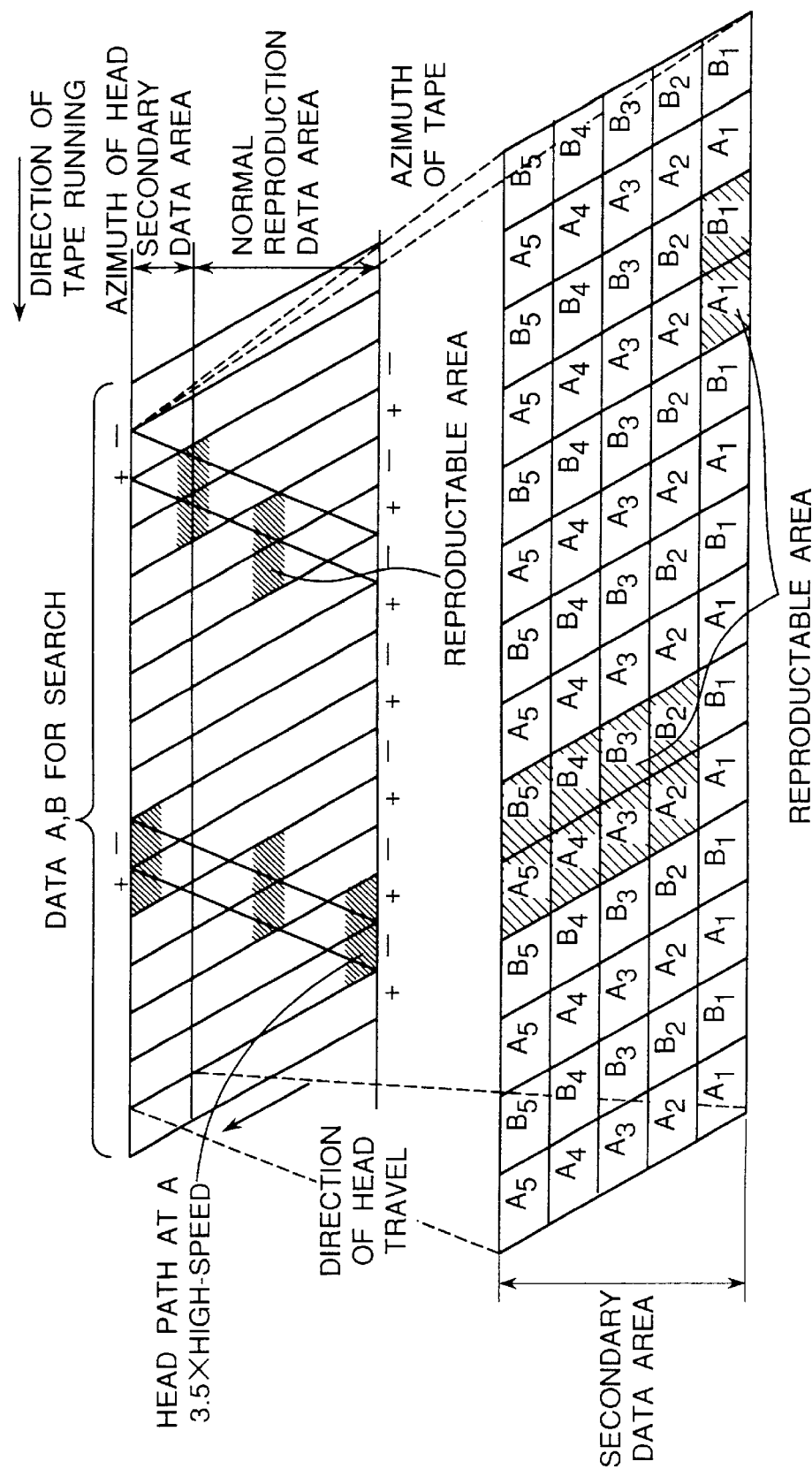
FIG. 8 is a diagram of the track pattern recorded by the heads arranged as shown in FIG. 7 according to the invention.

When two heads with different azimuth angles are placed one track apart at one point on the cylinder, the head path shown in FIG. 8 results in integer plus ½ multiples of the normal tape speed. By recording A, B, A, B, . . . to every other track in the high-speed reproduction areas, both A and B data can be reliably reproduced every two revolutions of the cylinder.

By thus comprising a secondary data generating circuit for generating secondary data from the coded television signal input, and a formatter for formatting the secondary data to record the same data plural times to n tracks, significant benefit can be obtained by means of a recording and reproducing apparatus according to the present invention applied in digital VCRs, including improved image quality during high-speed reproduction and stable image output.

Figure 9:
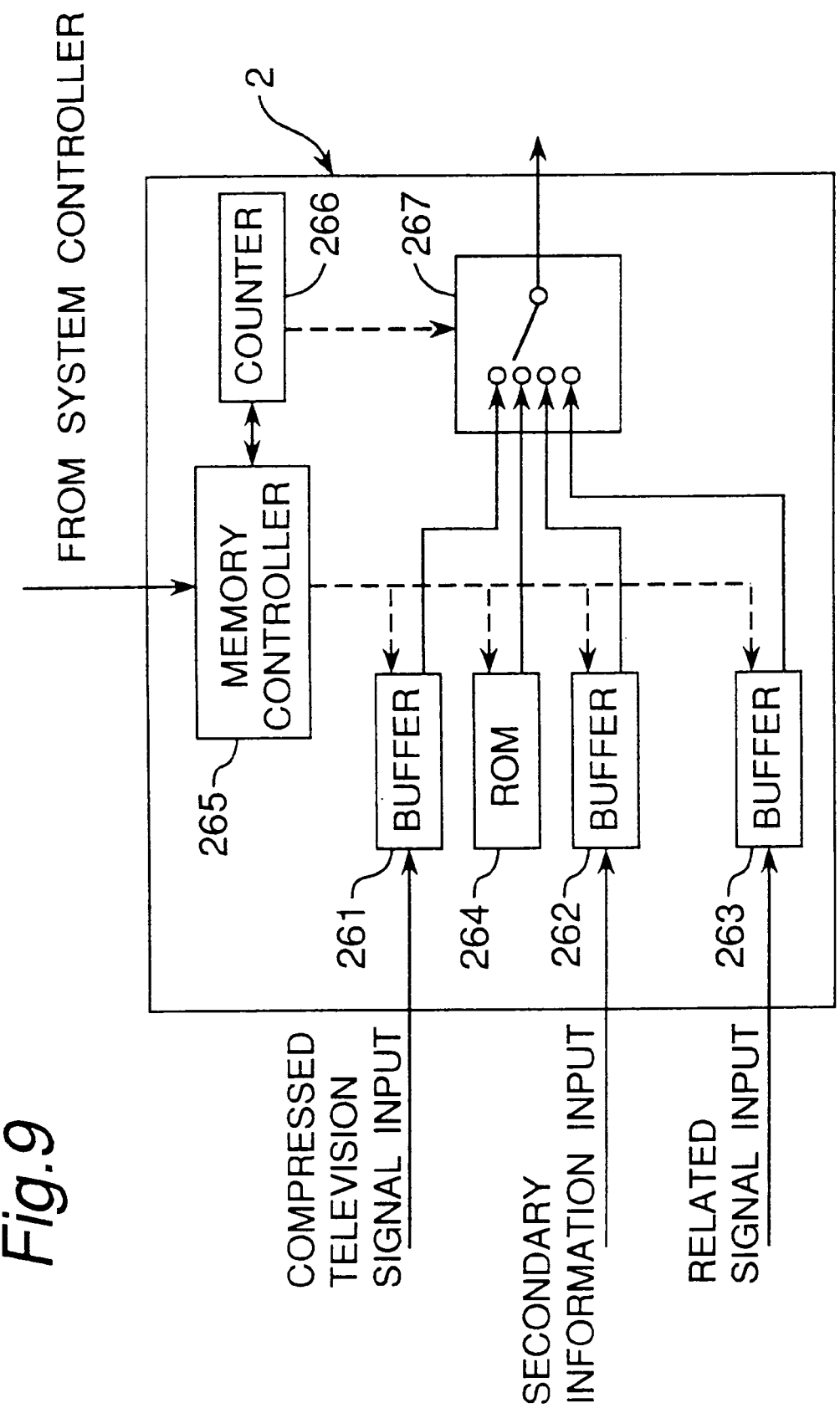
FIG. 9 is a block diagram of the formatter shown in FIG. 1.

Next, a composition of the formatter 2 shown in FIG. 1 is described below with reference of FIG. 9. In FIG. 9, reference numerals 261, 262 and 263 denote buffers, respectively, and 264, 265, 266 and 267 denote ROM, memory controller, counter and switch, respectively.

In operation of the formatter 2, input compressed television signal, secondary information signal and related signal are first stored in respective buffers 261, 262 and 263. ROM 264 stores fixed information such as headers of recording packets necessary for recording data on the tape beforehand. From the system controller 12, information such as present operational state of the deck, position of a track on the tape to which the recording head is contacting and the like is input to the memory controller 265 of the formatter 2. The memory controller 265 controls respective position and timing for starting reading with respect to respective buffers 261, 262 and 263 and ROM 264. The counter 266 detects a relative change in the position of the recording head in synchronization with type running by counting a track number and a number of a recording packet in each track, thereby enabling to select data to be recorded at the position of the recording head at that time by the switch 267. Various recording formats as shown in FIGS. 2, 3, 4, 6 and 8 can be realized by arranging the control method by the memory controller 265.

The composition of the formatter 2 described above is only one example and it can be realized by other compositions, for instance, by using a buffer memory to be provided in the error correction encoder 3 in common as these buffer memories of the formatter 2.

Figure 10:
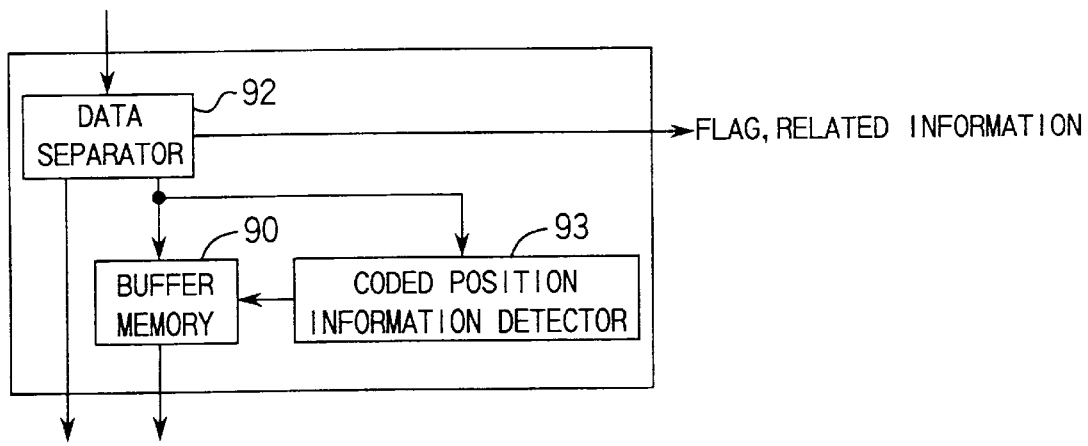
FIG. 10 is a block diagram of a first embodiment of the deformatter shown in FIG. 1.

A first embodiment of the deformatter according to the present invention is shown in FIG. 10, and comprises a buffer memory 90, data separator 92, and coded position information detector 93. The operation of this deformatter is described below.

The output of the error correction decoder 9 is separated by the data separator 92 to the coded television signal, secondary data, and related information, including the flags indicating whether secondary data is also recorded.

The coded position information detector 93 reads the coded data position information indicating which part of the frame each block of coded data in the reproduced data represents; this position information is read from the header of the corresponding position.

The reproduced data is then stored for a predetermined period to the buffer memory 90. Based on the coded data position information, the coded data of the same position can be refreshed to the most recent information by storing the data to the corresponding address (position) in memory. Areas for which the data is not refreshed within a predetermined period can be determined to be a data loss, thus allowing the switch 13 to be operated for interpolation from the secondary data.

Figure 11:
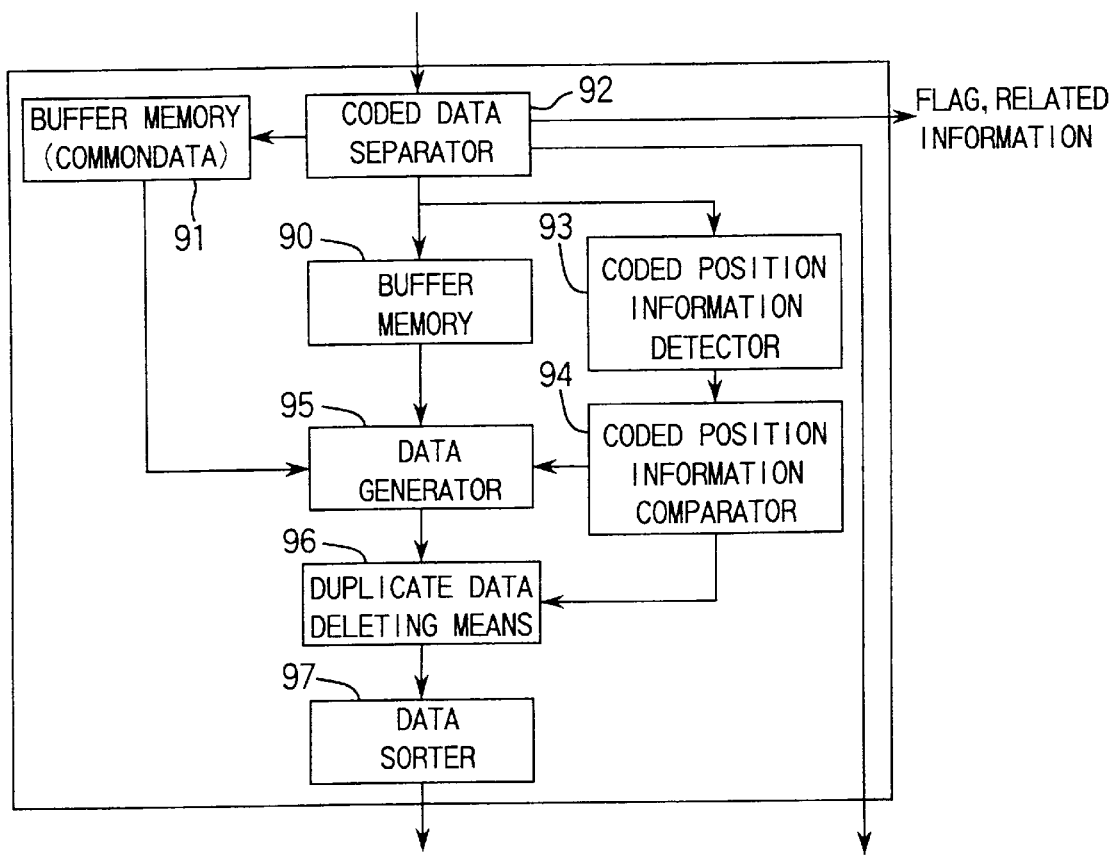
FIG. 11 is a block diagram of a second embodiment of the deformatter according to the invention.

A second embodiment of a deformatter according to the present invention is shown in FIG. 11. As shown in FIG. 11, this formatter comprises two buffer memories 90 and 91; a coded data separator 92; coded position information detector 93; coded position information comparator 94; data generator 95; duplicate data deleting means 96; data sorter 97; and memory 98. The operation of this formatter is described below.

The output of the error correction decoder 9 is separated by the coded data separator 92 to the coded television signal, secondary data, and related information, including the flags indicating whether secondary data is also recorded. The headers and other common data required for data decoding are detected and separated from the secondary data or from the coded television signal when so specified by the system controller.

The predetermined amount of the reproduced data is stored to the buffer memory 90; the common data is stored to the other buffer memory 91.

The coded position information detector 93 reads the coded data position information indicating which part of the frame each block of coded data in the reproduced data represents; this position information is read from the header of the corresponding position.

The coded position information comparator 94 compares the coded position information of each block to identify any data loss or duplication in the decoded frame.

The data generator 95 generates data to replace any reproduction data loss using the header information in the buffer memory 91 based on the data loss information output from the coded position information comparator 94.

As a first method of generating this replacement data, the small block coded data is generated using an "inter-frame coding, no coded data mode," and the small block of the previous frame is displayed as is.

As a second method of generating this replacement data, the coded data is generated using an "inter-frame coding, motion correction on, no coded data mode," and the small block is displayed after interpolating to compensate for movement from the previous frame.

As a third method of generating this replacement data, the coded data of the latest decoded frame is written to memory 98, and the coded data for the small block in the same position is generated by copying from memory 98.

As a fourth method of generating this replacement data, the latest intra-frame coded data for the small block is written to memory 98, and the coded data for the small block in the same position is generated by copying from memory 98.

As a fifth method of generating this replacement data, the data is generated from the secondary data for the same area, or by using or interpolating the DC component and DCT coefficient of each DCT block in the small block.

The duplicate data deleting means 96 deletes duplicated data from the reproduction data based on the duplication information output by the coded position information comparator 94.

The coded data for which lost data was generated and replaced and from which duplicated data was deleted is then re-formatted by the data sorter 97 to the sequence used by the decoder, and is output.

By generating and re-formatting data to replace any partial data loss occurring due to an error or during high-speed reproduction, the decoder is able to execute the normal decoding and reproduction process without executing any special operations.

During normal reproduction there will be neither data loss nor duplication occurring in all subareas of all frames, and there is therefore no data to delete or generate and replace. However, when an error occurs during reproduction, a partial loss of the coded data may occur that prevents normal reproduction of that area.

During n-times (where n is any number) high-speed reproduction, the data for the subareas of all positions will rarely be obtained during the period in which the data for one frame (the range of n-frames during normal reproduction) is obtained. In such cases it is therefore necessary to generate and replace the data for these dropped areas.

During slow reproduction modes, the heads may read data from the same track more than once. In such cases, one block of data is retained and the remaining data is deleted. During n-times (where n is any number) high-speed reproduction, the frame is reproduced at the rate of one frame per n frames, but the data of the subarea for the same position may be obtained plural times (i.e., duplicated) during the period obtaining the data for one frame (within the range of n frames during normal reproduction). In such cases, the data of the subarea belonging the newest frame time-wise is retained, and the other data is deleted.

By means of this configuration, the decoder is able to execute the normal decoding and reproduction process without executing any special operations by retaining and re-formatting only one of the duplicated data blocks when data for the same subarea is read plural times during slow reproduction modes, or the data of the most recent subarea when data for the same frame subarea is read but the frame numbers differ during high-speed reproduction modes, and deleting the duplicated data.

In addition, when macro block data is lost due to an error or during high-speed reproduction, the decoder is able to execute the normal decoding and reproduction process without executing any special operations by generating and re-formatting replacement data for the macro block at that position.

Figure 12:
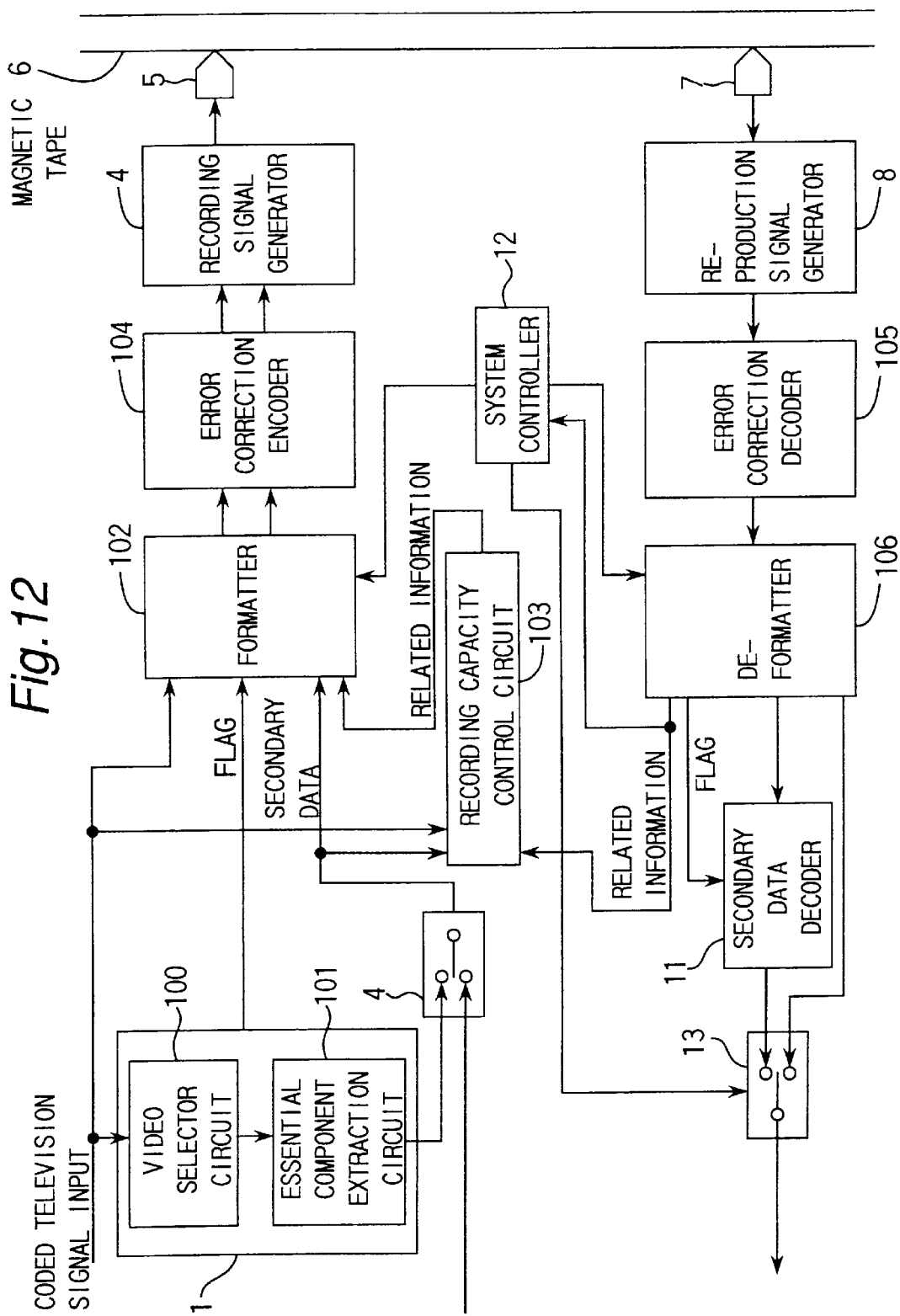
FIG. 12 is a block diagram of the second embodiment of the recording and reproducing apparatus according to the invention.

The second embodiment of the invention is described below with reference to the accompanying figures, of which FIG. 12 is a block diagram of a coded television signal recording and reproducing apparatus according to the second embodiment of the invention.

As shown in FIG. 12, a recording and reproducing apparatus according to this embodiment comprises a secondary data generating circuit 1, formatter 102, recording capacity control circuit 103, error correction encoder 104, recording signal generator 4, recording head 5, magnetic tape 6, reproduction head 7, reproduction signal generator 8, error correction decoder 105, deformatter 106, secondary data decoder 11, system controller 12, and switch 13.

Operation during recording is described below.

The secondary data generated by the secondary data generating circuit 1 is input to the formatter 102. The required recording capacity, allocation on tape, and sequence are calculated by the recording capacity control circuit 103 from the rate of the secondary data and the rate of the coded television signal. The formatter 102 formats the input coded television signal and secondary data within the capacity, tape allocation, and sequence output from the recording capacity control circuit 103, and the data is recorded to magnetic tape 6.

Related information indicating, for example, the recording capacity and type of secondary data is generated from an output of the error correction encoder 3 and the coded television signal; this related information is also input to the formatter 102 with the coded television signal and the secondary data, and is recorded to the magnetic tape 6. The related information is also recorded to the semiconductor memory affixed to the tape cassette.

By means of this operation, the generated secondary data, and related information indicating, for example, the recording capacity of the coded television signal and the secondary data, are recorded to the magnetic tape 6 in addition to the input coded television signal.

During reproduction, the recorded data is reproduced by the reproduction head 7 from the magnetic tape 6, is processed as required for decoding, synchronization address deletion, and other processes by the reproduction signal generator 8, and the processed data is output as the reproduction signal to the error correction decoder 9. The reproduction signal is error corrected by the error correction decoder 9, and is then output to the deformatter 10.

The deformatter 10 first reproduces the related information for the presence of secondary data and the recording capacity, allocation, and position of the secondary data. When the related information is also recorded to a semiconductor memory affixed to the tape cassette, the related information can be obtained even more easily from the semiconductor memory. Based on this related information, the deformatter 10 separates and separately outputs the input coded television signal and secondary data.

The secondary data decoder 11 expands the compressed secondary data, restoring the data to the same format as the coded television signal, and outputs the expanded, formatted data.

The coded television signal and the expanded secondary data are switched each frame by the switch 13.

By means of this configuration, even when the input coded television signal and secondary data are recorded with varying plural rates, the data can be recorded and reproduced without waste by switching and selecting the recording capacity, allocation, and position best suited to the current data. The recording capacity recorded as secondary data can therefore also be known during reproduction, and the input signal and secondary data can be separately reproduced.

The error correction encoder 104 in the second embodiment of the invention described above is described with reference to the accompanying figures below. Two cases are shown as examples of recording capacity switching: recording different data to two areas, and recording the same data to two areas.

Figure 13:
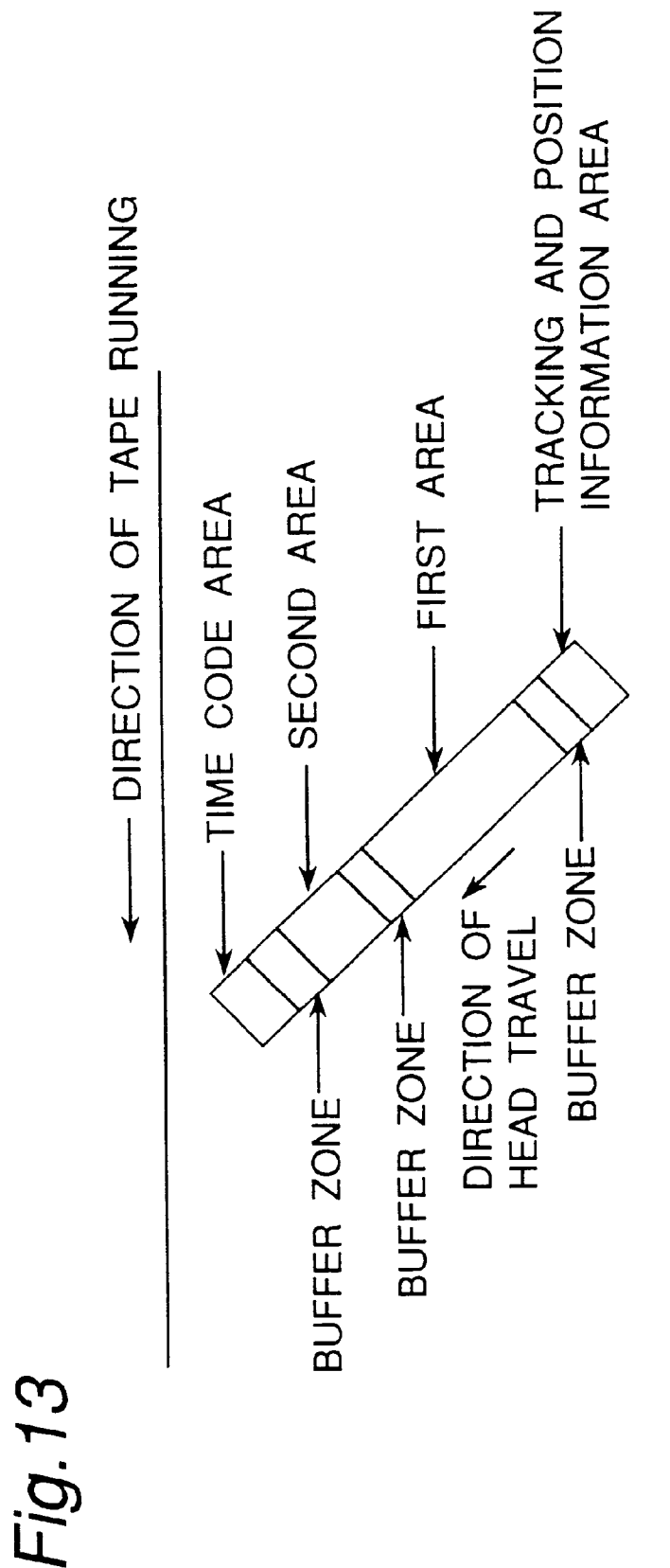
FIG. 13 is a track format diagram used to describe the operation of the error correction coding means in the second embodiment of the invention.

The format of the tracks formed on tape is shown in FIG. 13.

A tracking and position information area, first area, second area, and time code area are provided in sequence from the starting position of head travel through the track, and a buffer zone is provided between each of these other areas. Information enabling precise tracking and information for determining the position of each area are recorded to the tracking and position information area; a time code, indexing information, and other secondary data are recorded to the time code area.

If the first and second areas are used differently, e.g., if the video data is allocated and recorded to the first area and the audio data to the second area, or if the input coded television signal is allocated and recorded to the first area and the secondary data to the second area, the error correction encoder separately error correction codes the data allocated to each area. By separately coding the data for each area, each data type can be coded and recorded with a separate specific error correction capacity, and each area can therefore be separately edited.

If, however, the signals are recorded grouping these areas together, the error correction encoder applies error correction coding to the data as a single block. Processing and recording the data this way also effectively improves the error correction capacity because the areas cannot be separately edited and there are therefore no editing problems, and the interleave area can be increased by grouping the areas together.

By means of this configuration, it is possible to provide a system that selects the error correction coding used according to the allocation method of the areas used for recording, and can thereby record various data types.

Figure 15A:
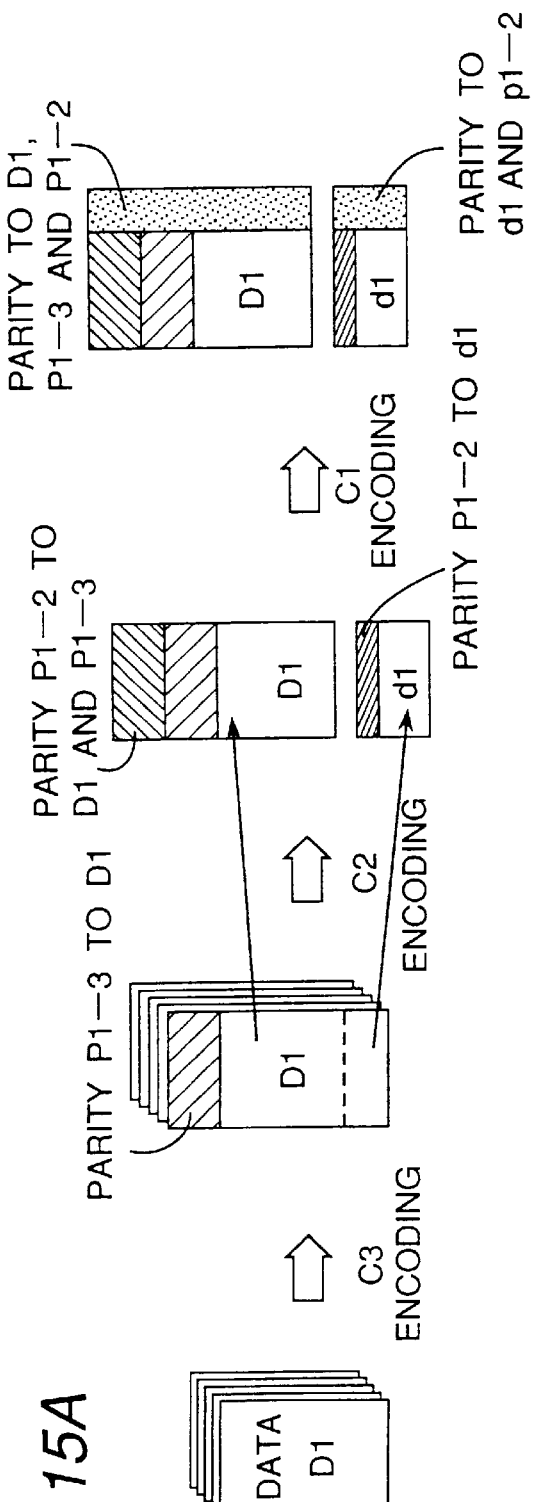
FIGS. 15A and 15B are data flow diagrams for the first embodiment of the error correction coding means according to the second embodiment of the invention.
Figure 15B:
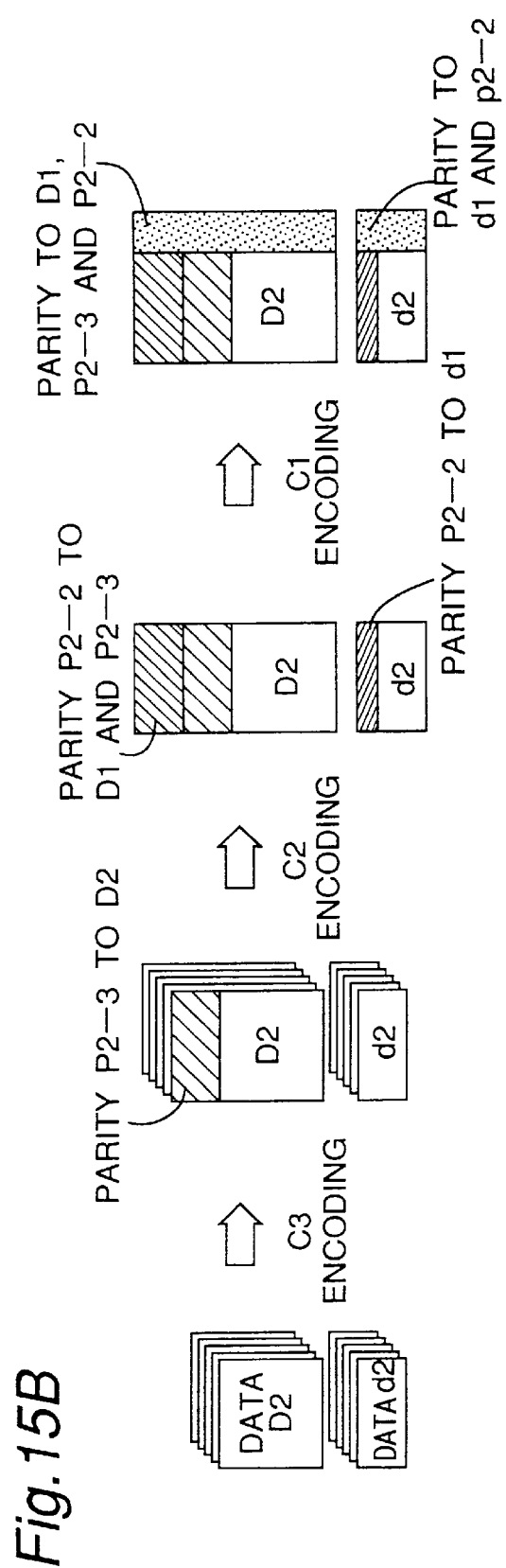
Figure 17A:
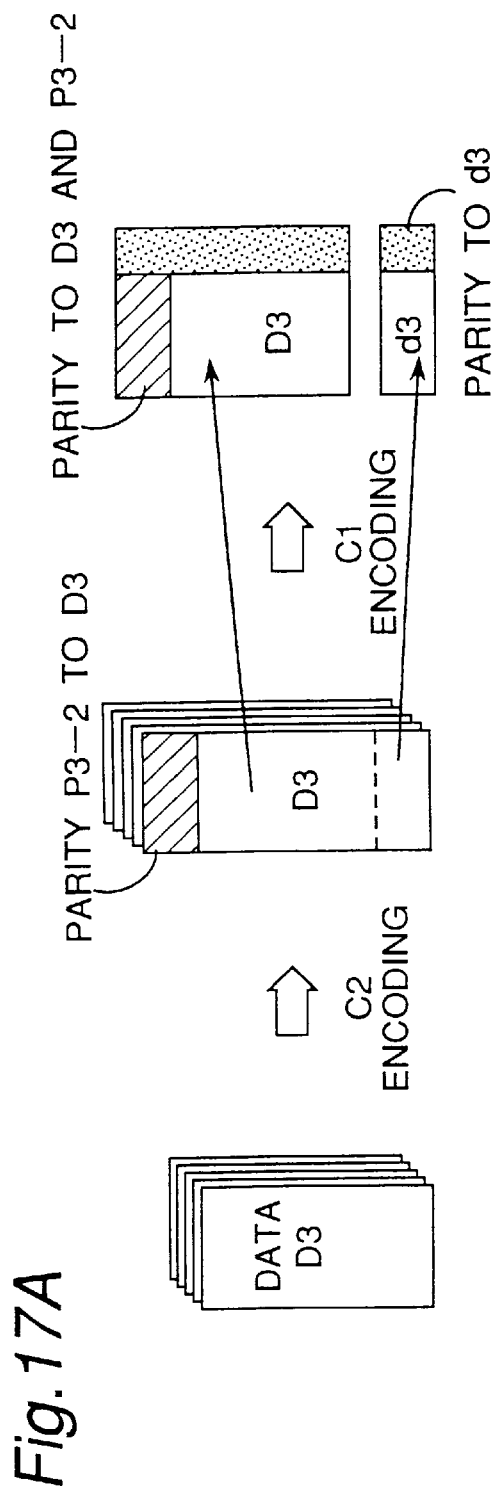
FIGS. 17A, 17B, 17C and 17D are data flow diagrams for the second embodiment of the error correction coding means according to the second embodiment of the invention.
Figure 17B:
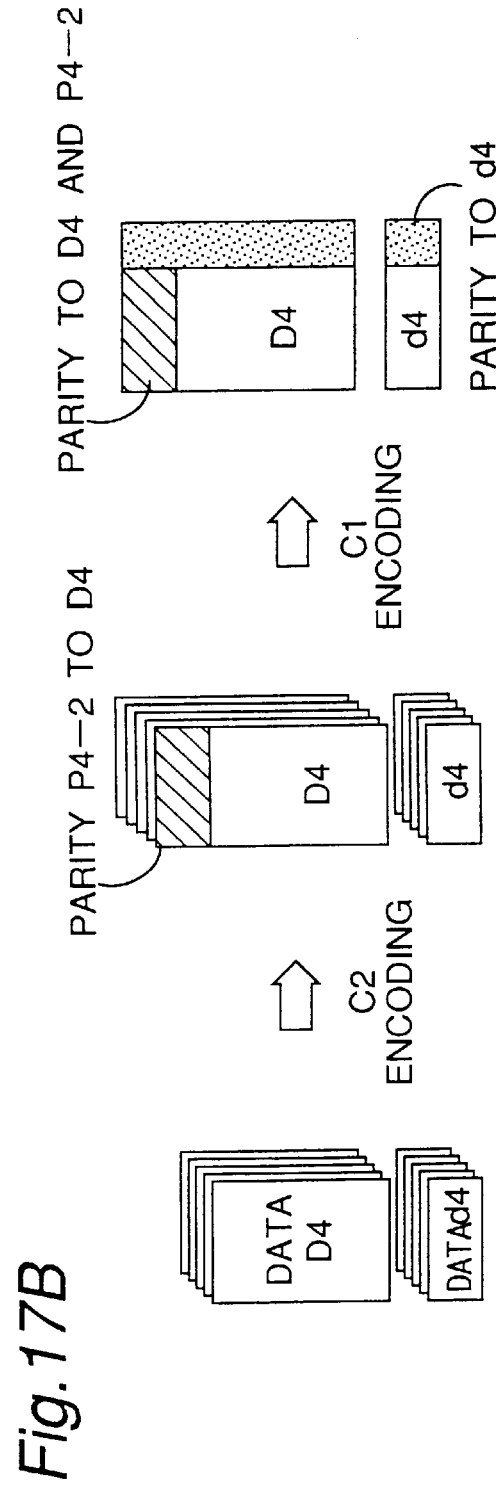
Figure 17C:
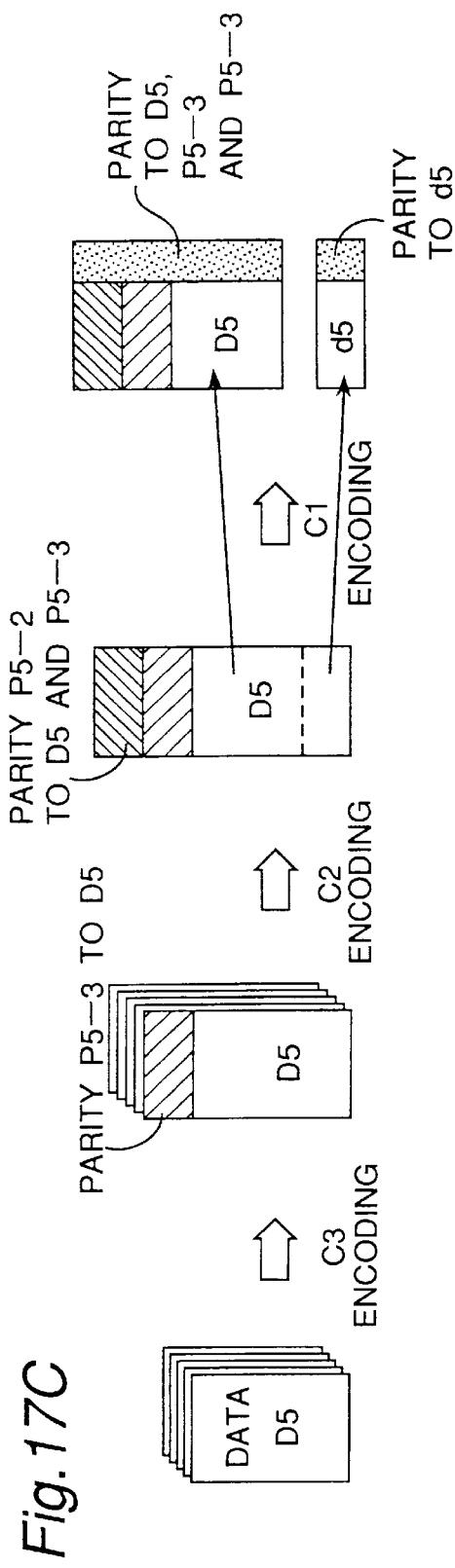
Figure 17D:
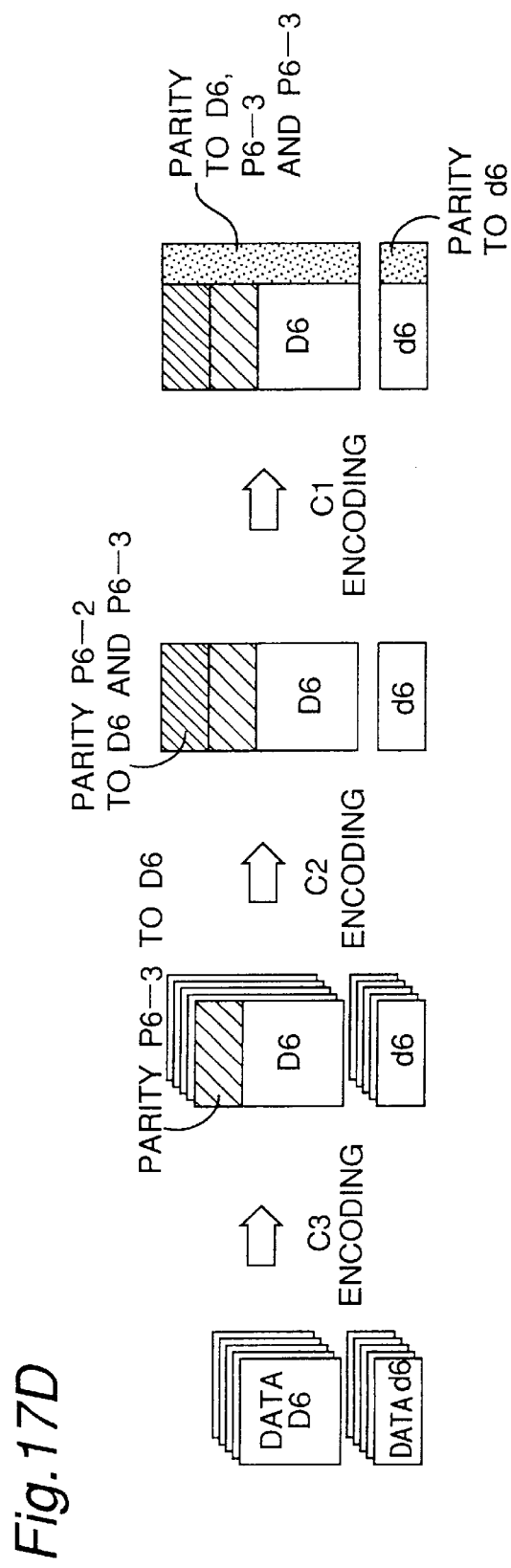

FIG. 14 is a block diagram of a first embodiment of an error correction encoder according to the present invention. As shown in FIG. 14, this error correction encoder comprises a first input 121, a second input 122, and a mode selection data input 123. Also shown are first switches 131a and 131b; a second switch 132; a C3 encoder 133; a first C2 encoder 134; a second C2 encoder 135; a third switch 136; a C1 encoder 137; and a switch controller 138. The operation of this error correction encoder is described below with reference to FIG. 14, and the data flow diagrams shown in FIGS. 15A and 15B.

The data recorded through the first input 121 to the first area, and the data recorded through the second input 122 to the second area, are input to the error correction encoder. Based on the mode selection data input from the mode selection data input 123, the error correction encoder selects the error correction code for each input data type, and applies the corresponding error correction. The mode selection data is also recorded as related information, and is used during reproduction to determine in which mode the data was recorded.

First switches 131a and 131b are controlled by the mode selection data to switch to the terminal 1 side when error correction is applied grouping the data recorded to the first area and the data recorded to the second area together, and to switch to the terminal 2 side when error correction is applied separately to the data recorded to the first area and the data recorded to the second area. When the first switch 131a is switched to the terminal 2 side, the output is all zeros or another constant value.

The data recorded to the first area and the data recorded to the second area are selected by the second switch 132 and input to the C3 encoder 133. Based on the mode selection data, the data is then coded using the selected error correction code. If an error correction code using the same generating function is used changing only the code length and not changing the check symbol number, the circuit configuration is simple, and the circuit configuration of the error correction decoder used to reproduce the data recorded by means of the invention is also simplified.

The data recorded to the first area and the check symbol of the C3 code are output to the first C2 encoder 134, and the data recorded to the second area is output to the second C2 encoder 135. The first C2 encoder 134 and the second C2 encoder 135 apply the respective error correction coding to the respective data inputs.

The third switch 136 switches between the data recorded to the first area, the check symbol of the C3 code, and the check symbol of the first C2 code output from the first C2 encoder 134, and the data recorded to the second area and the check symbol of the second C2 code output from the second C2 encoder 135, and outputs to the C1 encoder 137.

The C1 encoder 137 applies the error correction coding of the C1 code. The switch controller 138 controls the operation of the second switch 132 and the third switch 136.

As examples of the error correction codes, the (85, 77) Reed-Solomon code may be used as the C1 code; (149, 138) Reed-Solomon code as the first C2 code; (14, 9) Reed-Solomon code as the second C2 code; and (147, 136) or (138, 127) Reed-Solomon code as the C3 code.

By means of this configuration it is possible to provide a flexible system capable of selecting between a mode for recording data to both first and second areas; and a mode for recording data only to the first area, reserving the second area as an optional area for editing and recording.

It is to be noted that different C2 codes are used in the first and second areas with the error correction encoder described above, but the same effect can be obtained using the same error correction code. In addition, the same C1 code is used in the first and second areas, but the same effect can be obtained using an error correction code that differs by area.

A second embodiment of the error correction encoder according to the present invention is shown in FIG. 16. As shown in FIG. 16, this error correction encoder comprises first switches 131a and 131b; a second switch 132; a C2 encoder 143; a third switch 136; a C1 encoder 147; and a switch controller 148. The operation of this error correction encoder is described below with reference to FIG. 15, and the data flow diagrams shown in FIGS. 17A, 17B, 17C and 17D.

First switches 131a and 131b are controlled by the mode selection data to switch to the terminal 1 side when error correction is applied grouping the data recorded to the first area and the data recorded to the second area together, and to switch to the terminal 2 side when error correction is applied separately to the data recorded to the first area and the data recorded to the second area. When the first switch 131a is switched to the terminal 2 side, the output is all zeros or another constant value.

The data recorded to the first area and the data recorded to the second area are selected by the second switch 132 and input to the C2 encoder 143. Based on the mode selection data, the data is then coded using the selected error correction code. If an error correction code using the same generating function is used changing only the code length and not changing the check symbol number, the circuit configuration is simple, and the circuit configuration of the error correction decoder used to reproduce the data recorded by means of the invention is also simplified.

The data recorded to the first area and the check symbol of the C2 code are output to the terminal x side of the third switch 136, and the data recorded to the second area is output to the terminal 1 side of the first switch 131b.

The third switch 136 switches between the data recorded to the first area and the check symbol of the C2 code output from the C2 encoder 143, and the data recorded to the second area and output from the first switch 131b, and outputs to the C1 encoder 137.

The C1 encoder 137 applies the error correction coding of the C1 code. The switch controller 148 controls the operation of the second switch 132 and the third switch 136.

As examples of the error correction codes, the (85, 77) Reed-Solomon code may be used as the C1 code; and (163, 152) or (149, 138) Reed-Solomon code as the C2 code.

By means of this configuration it is possible to provide a flexible system capable of selecting between a mode for recording data to both first and second areas; and a mode for recording data only to the first area, reserving the second area as an optional area for editing and recording.

A system such as this can be used for recording coded television signals in which various types of signals can be expected. Data types that may be recorded optionally during editing include audio signals recorded after the initial video recording, and secondary data to be used for special playback modes.

Modes other than those described above can also be used. For example, if a configuration combining the above two types of error correction encoders is used, a mode for batch error correction coding the data recorded to each area using both C3 and C2 codes, and a mode for error correction coding the data recorded to the first area only using C3 and C2 codes, can be used as shown in FIGS. 17A, 17B, 17C and 17D. Alternatively, as shown in FIG. 8, when the data recorded to the first area is in excess by an amount equivalent to the check symbol of the C3 code, a mode not applying C3 coding can also be used.

The secondary data decoder according to the present invention is described next.

The data generated by the secondary data generator during recording may be one of two major types: the first is pre-coded to the format of the coded television signal after extracting the essential components during recording; the other directly records the extracted essential components. With the former, the DC component of the intra-frame coded data is extracted, decoded to the transfer packet format of the specified coded signal, and then converted to the recording signal format by the recording signal generator for recording. With this data type a secondary data decoder is not needed during reproduction.

With the latter, the data is recorded without decoding to the transfer packet format. When the DC component of the video signal of the coded television signal is DPCM and variable length coded, the value of the DC component itself may be recorded. As a result, a secondary data decoder is needed during reproduction, but the data can be recorded efficiently without recording redundant data such as the header part of the transfer recording packet or the block divisions. In addition, the error propagation range can be limited because variable length coding is not used.

Figure 18:
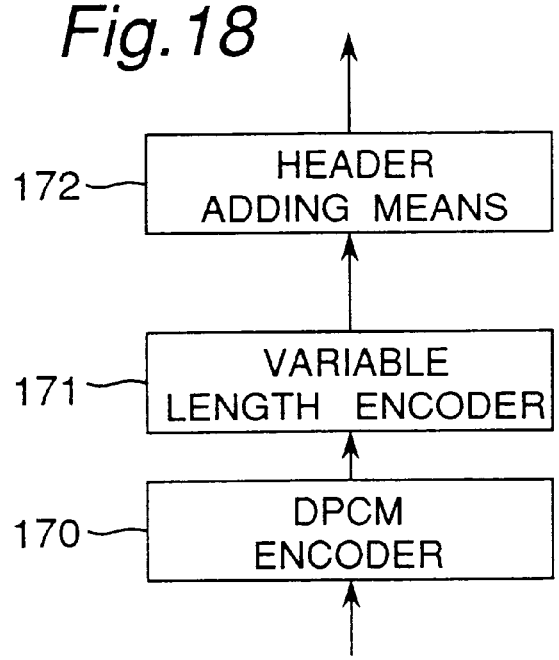
FIG. 18 is a block diagram of a first embodiment of the secondary data decoding means according to the second embodiment of the present invention.

FIG. 18 is a block diagram of a first embodiment of the secondary data decoder according to the present invention. As shown in FIG. 18, this secondary data decoder comprises a DPCM encoder 170, variable length encoder 171, and header adding means 172.

The DC component of the input secondary data is converted to a variable length form by the DPCM encoder 170 and variable length encoder 171, and a header of the transfer packet format of the coded television signal is then added by the header adding means 172 before outputting the decoded data.

A second embodiment of a secondary data decoder according to the present invention is described below. This secondary data decoder generates data during decoding to improve the picture quality.

Figure 19:
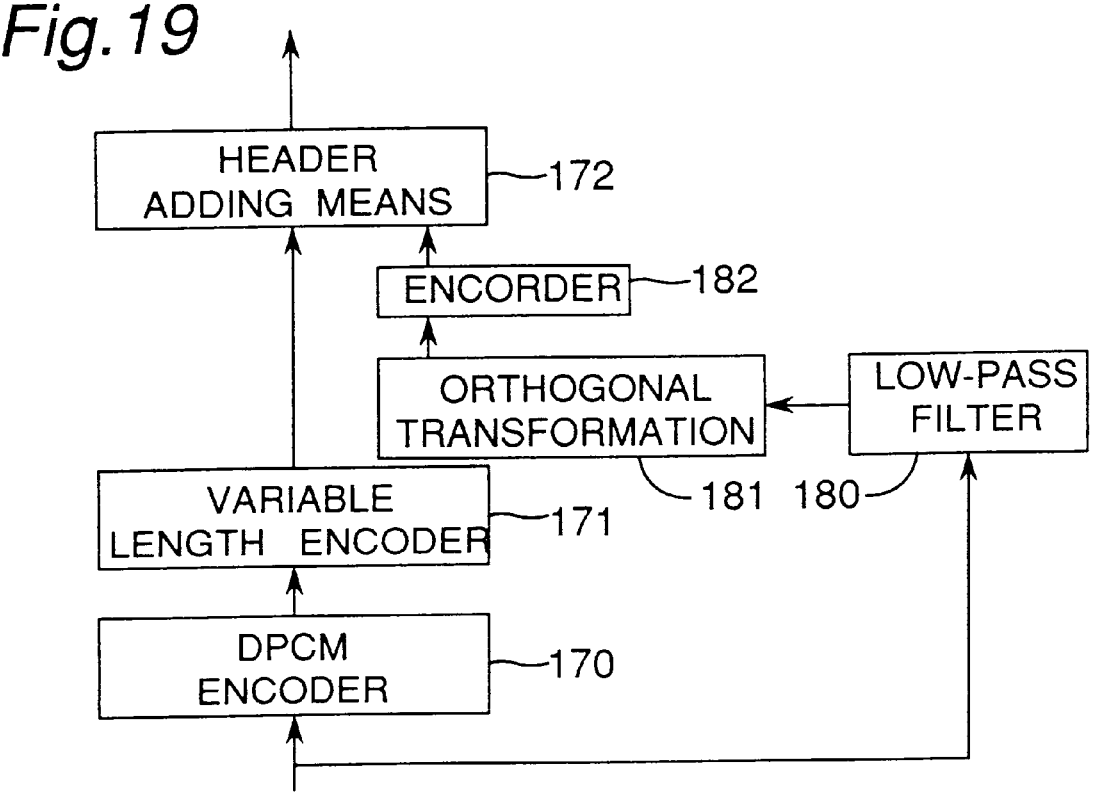
FIG. 19 is a block diagram of a second embodiment of the secondary data decoding means according to the second embodiment of the present invention.

A second embodiment of the secondary data decoder is shown in FIG. 19. As shown in FIG. 19, this secondary data decoder comprises a DPCM encoder 170, variable length encoder 171, header adding means 172, low-pass filter 180, orthogonal transformation means 181, and encoder 182.

The DC component of the input secondary data is converted to a variable length coded form by the DPCM encoder 170 and variable length encoder 171. The DC component is then used to generate a low-pass orthogonal transformation coefficient.

An interpolated image passed through the low-pass filter is generated by the low-pass filter 180 for frames of which each block and the surrounding blocks are reproduced from only the DC component. An orthogonal transformation is then applied by the orthogonal transformation means 181 to the interpolated image of each block obtained by filtering. The obtained orthogonal transformation coefficient is then variable length coded by the encoder 182.

By thus generating an interpolated image by filtering in the reproduction apparatus and then applying an orthogonal transformation, it is possible to simulate the low frequency component of the frame even when only the DC component is recorded.

A header of the transfer packet format of the coded television signal is then added by the header adding means 172 to the variable length code of the DC component and the variable length code of the low frequency orthogonal transformation coefficient before outputting the decoded data.

The recorded secondary data at this time is only the DC component, but because the output data also contains the simulated low frequency component, the block after decoding is equivalent to the filtered, interpolated frame even when the external decoder is not provided with a low-pass filter.

Note that the low-pass filter 180 may be of any desired type, and plural filters may also be used selectively. In addition, any number of orthogonal transformation coefficients obtained from the orthogonal transformation means 181 may be output to the encoder 182.

Figure 20:
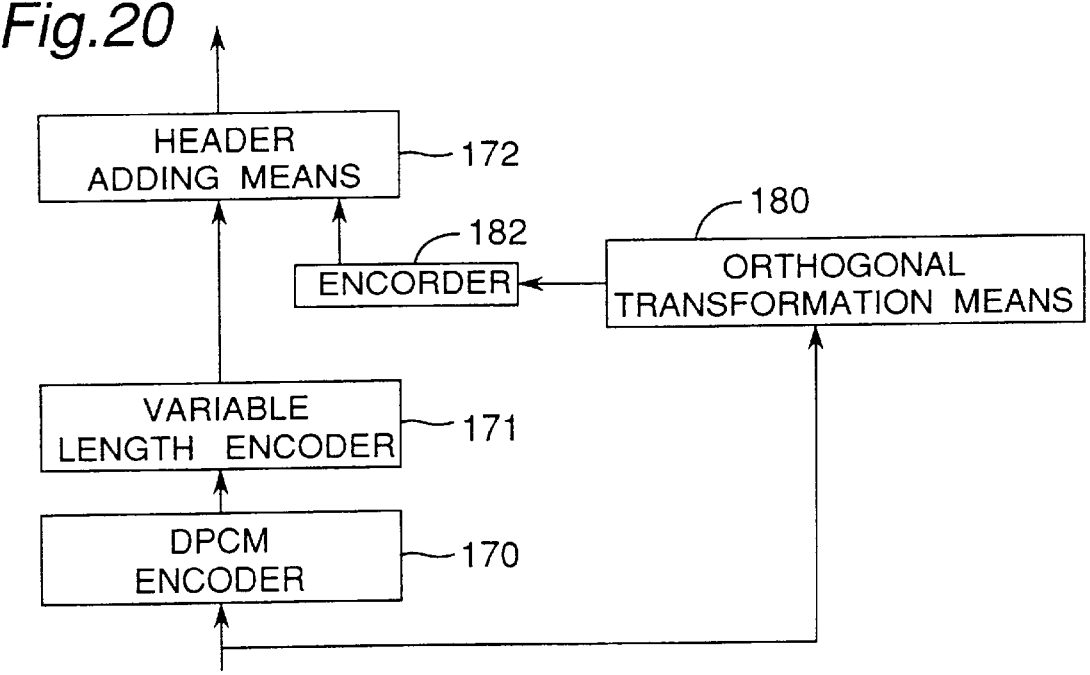
FIG. 20 is a block diagram of a third embodiment of the secondary data decoding means according to the present invention.

A third embodiment of the secondary data decoder according to the invention is shown in FIG. 20. As shown in FIG. 20, this secondary data decoder comprises a DPCM encoder 170, variable length encoder 171, header adding means 172, orthogonal transformation means 190, and encoder 182.

The DC component of the input secondary data is converted to a variable length coded form by the DPCM encoder 170 and variable length encoder 171.

The DC component is then used to generate a low-pass orthogonal transformation coefficient.

The method of generating the low frequency component by means of the orthogonal transformation means 190 is described below with reference to FIGS. 21A to 21D. It is assumed here that a 2×2 degree low-pass coefficient is generated; blocks $DC_{1,0}$ and $DC_{1,1}$ are focused on in the description below.

When the DC components of each block are positioned as shown in FIG. 21A, the value of a zero degree orthogonal transform is expressed by the average value of the interval spanning these two blocks ($DC_{1,0}$ and $DC_{1,1}$) (FIG. 21B), i.e., the average of the two block values (FIG. 21C), and the difference of this average value and the two block values can be used as the value of a first degree orthogonal transform (FIG. 21D). It is possible by applying an orthogonal transform to the surrounding DC components using an equation such as shown in equation 1

$$\begin{vmatrix} DC_{0,0} & DC_{0,1} \\ DC_{1,0} & DC_{1,1} \end{vmatrix} \times \begin{vmatrix} 1 & -1 \\ -1 & 0 \end{vmatrix} = \begin{vmatrix} Cf_{0,0} & Cf_{0,1} \\ Cf_{1,0} & Cf_{1,1} \end{vmatrix} \quad [1]$$

to simulate the low frequency component of the area surrounded by a dotted line (FIG. 21A). By using this as the low frequency component of the adjacent blocks by approximation, it is possible to generate the low frequency component by simulation without using a low-pass filter. The resulting orthogonal transformation coefficient is then variable length coded by the encoder 182.

A header of the transfer packet format of the coded television signal is then added by the header adding means 172 to the variable length coded DC component and the variable length coded low frequency orthogonal transformation coefficient before outputting the decoded data.

Note that the orthogonal transformation means 190 may be of any desired type and degree. In addition, the number and position of the surrounding DC components used to generate the low frequency component may differ according to the specifications of the orthogonal transformation means.

Figure 22:
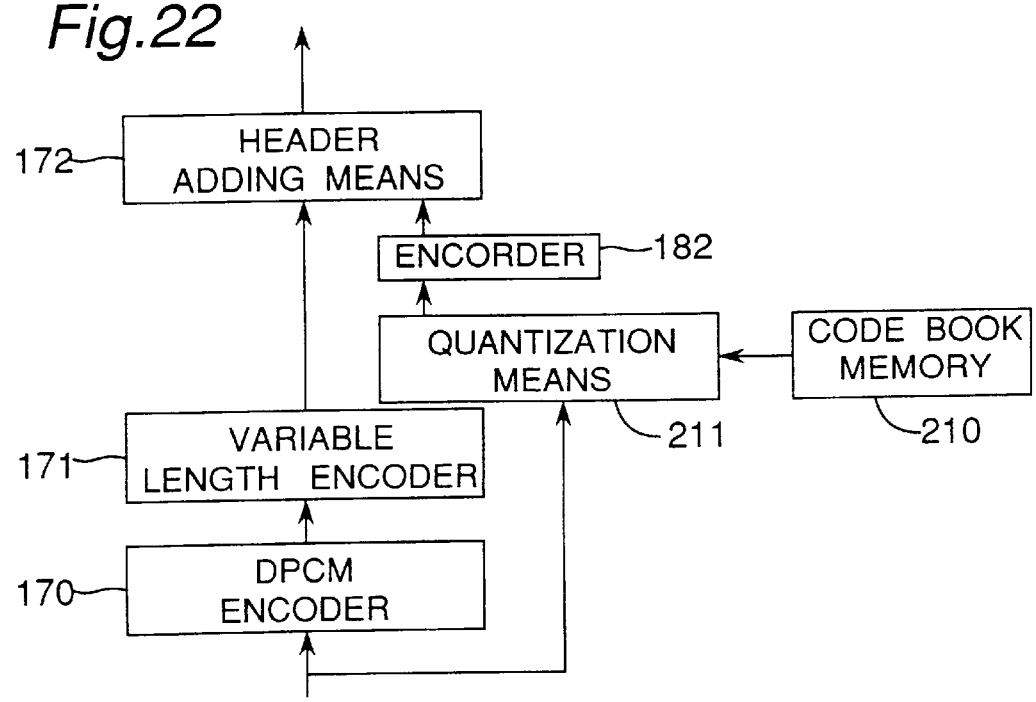
FIG. 22 is a block diagram of the fourth embodiment of a secondary data decoding means in the present invention.

A fourth embodiment of the secondary data decoder according to the invention is shown in FIG. 22. As shown in FIG. 22, this secondary data decoder comprises a DPCM encoder 170, variable length encoder 171, header adding means 172, orthogonal transformation means 190, code book memory 210, and quantization means 211.

The DC component of the input secondary data is converted to a variable length coded form by the DPCM encoder 170 and variable length encoder 171.

The code word of the low frequency component of each block is then generated from the DC components of each block and the surrounding blocks. The principle of this operation is described below.

Figures 23, 24:
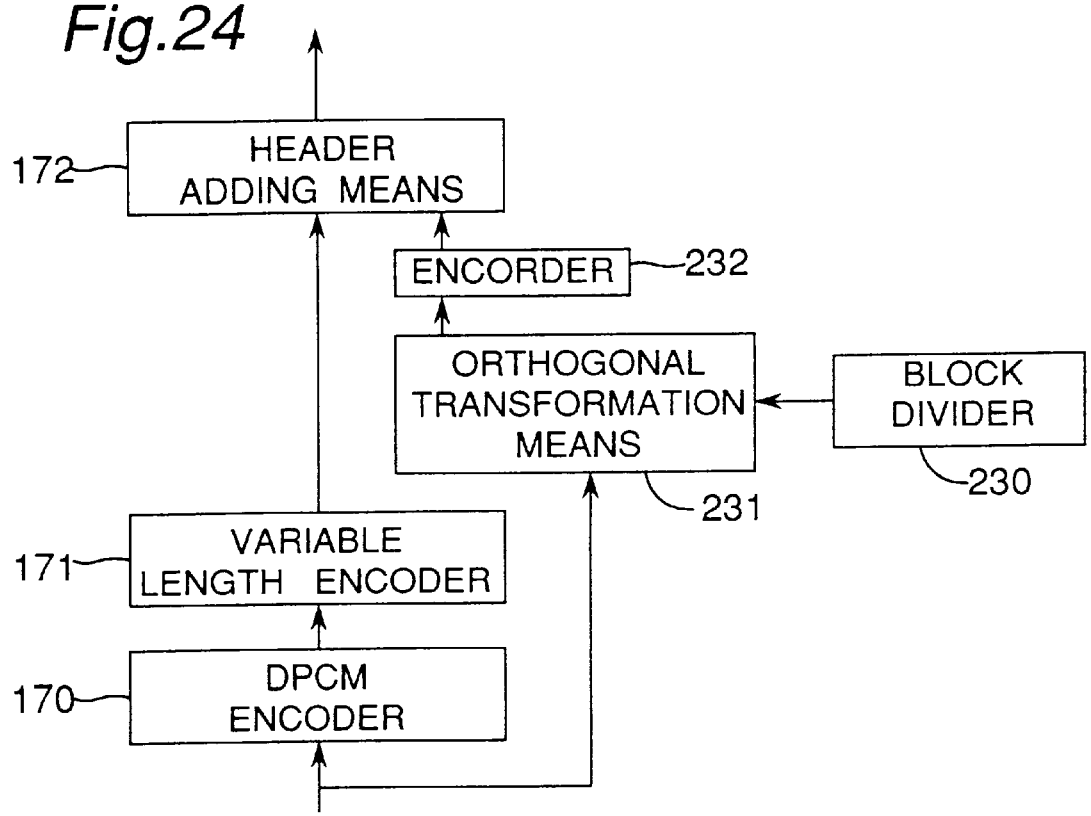
FIG. 23 is an explanatory diagram used to describe the low band component generating method of the fourth embodiment of a secondary data decoding means in the present invention.
FIG. 24 is a block diagram of a fourth embodiment of the secondary data decoding means according to the present invention.

When the DC components of each block are positioned as shown in FIG. 23 and the DC components of the five blocks including the target block and the blocks vertical and horizontally adjacent thereto, e.g., $DC_{0,0}$, $DC_{1,0}$, $DC_{0,-1}$, $DC_{0,1}$, $DC_{1,0}$, are known, it is possible to obtain, as described in the second embodiment of the invention: an interpolated image of the target block; the conversion coefficient of the block by applying an orthogonal transformation thereto; and a code word for the conversion coefficient. When the type of filter, type of orthogonal transformation, and type of encoder can be identified, the code word obtained from the target block is uniformly determined by the values of the five DC components. Using this, all combinations of five DC component values can be related to the code words derived therefrom, and stored in the code book memory 210.

It is to be noted that the number of elements stored in the code book can be reduced using the symmetry of values in surrounding blocks. By limiting the number of DC component levels, the number of elements stored in the code book can be further reduced. The code work of the target block is obtained by inputting the five DC components to the quantization means 211, and comparing the values with the elements stored in the code book memory 210. As a result, the low frequency component can be simulated without using a low-pass filter, orthogonal transformation means, or encoder.

A header of the transfer packet format of the coded television signal is then added by the header adding means 172 to the variable length coded DC component and the variable length coded low frequency orthogonal transformation coefficient before outputting the decoded data.

A fifth embodiment of the secondary data decoder according to the invention is shown in FIG. 24. As shown in FIG. 24, this secondary data decoder comprises a DPCM encoder 170, variable length encoder 171, header adding means 172, orthogonal transformation means 190, encoder 182, block divider 230, orthogonal transformation means 231, and encoder 232.

The DC component of the input secondary data is converted to a variable length coded form by the DPCM encoder 170 and variable length encoder 171.

In this embodiment the DC components of each block are handled as though they are individual pixels. The block divider 230 divides the DC components of each block according to the on-screen position to generate the DC component blocks. An orthogonal transform is then applied to the DC component blocks by the orthogonal transformation means 231. The resulting orthogonal transformation coefficients are then coded by the encoder 232.

By thus handling the DC components of each block as individual pixels and applying an orthogonal transformation to the DC component blocks, a reduced image with each block represented as one pixel can be obtained when the output data is then decoded by the decoder. The vertical and horizontal dimensions of this reduced image are a fraction of the number of pixels (blocks) in each direction, and are ⅛ in this embodiment due to the size of the DCT blocks; images of approximately this size can be easily recognized during high-speed reproduction. In addition, by representing each block as a single pixel, flat blocks are not displayed and image deterioration is not a problem.

By means of the second, third, and fourth embodiments of the secondary data decoder as described above, the decoded result will be equivalent to a smoothed image, and block distortion in the reproduced image can be reduced, even when the external decoder is not provided with a smoothing means, by generating the remaining orthogonal transformation coefficients from the DC components of the extracted block and surrounding blocks, and formatting the coefficients to the format of the decoded data.

By means of the second embodiment of the secondary data decoder as described above, the low-pass filter can be made unnecessary because part or all of the conversion coefficients in each block can be interpolated by an orthogonal transformation when generating the remaining orthogonal transformation coefficients from the DC components of the extracted block and surrounding blocks.

By means of the third embodiment of the secondary data decoder as described above, the code word of the orthogonal transformation coefficient of each block can be directly determined by vector quantization from the DC components of the extracted block and surrounding blocks by pre-compiling and storing a vector quantization code book; this code book comprises the values of the DC components of the extracted block and surrounding blocks, and the code words of the coded conversion coefficients for each block, and is compiled when generating the remaining orthogonal transformation coefficients from the DC components of each block and the surrounding blocks. As a result, the low-pass filter, orthogonal transformation means, and encoder are made unnecessary.

By means of the fourth embodiment of the secondary data decoder as described above, the decoder can reproduce a reduced image of the recorded image during high-speed reproduction by handling each DC component as a single pixel value, coding in block units, and sending the result to the decoder.

Figure 26:
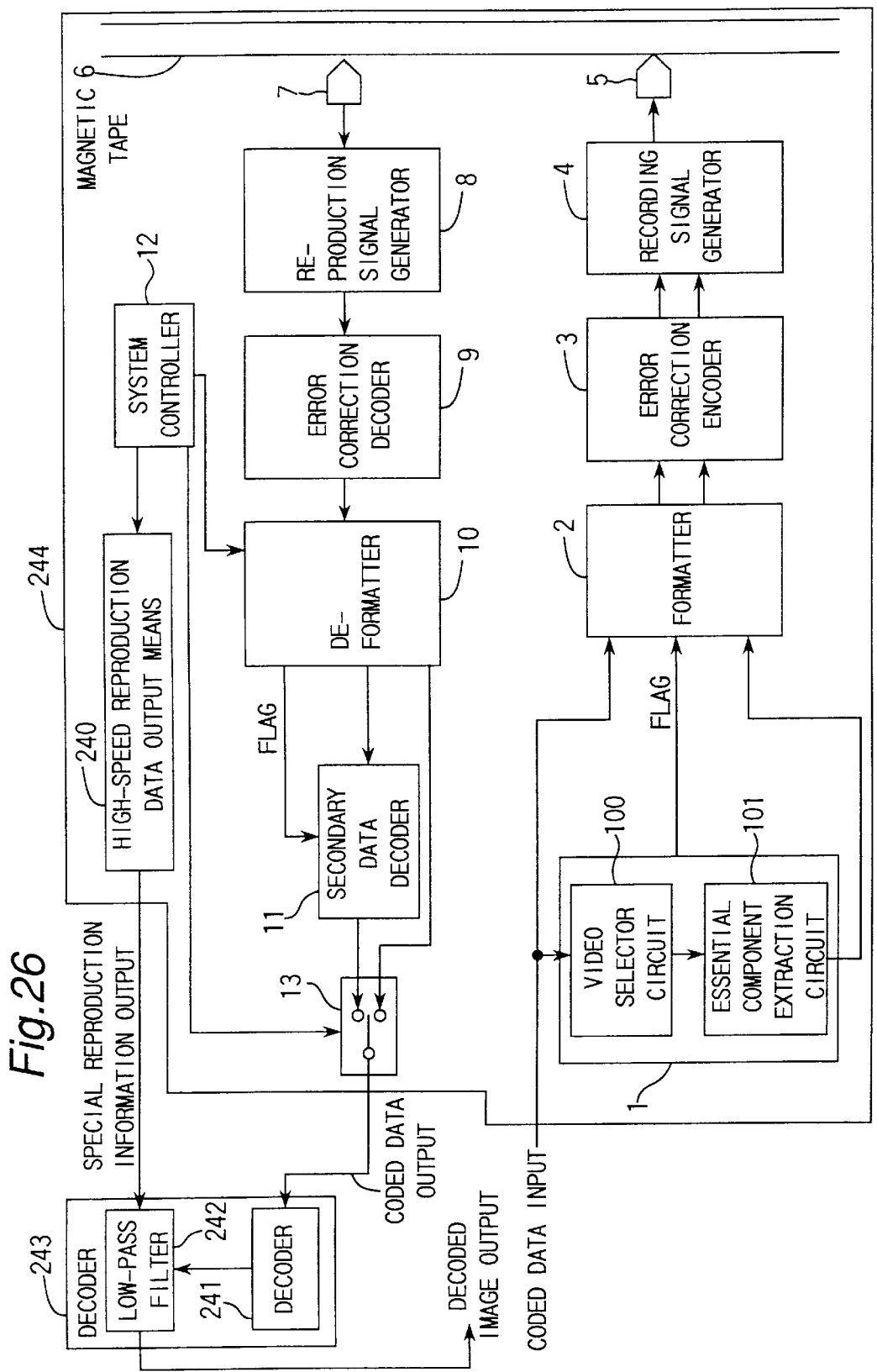
FIG. 26 is a block diagram of a third embodiment of the invention.

FIG. 26 is a block diagram of a recording and reproducing system according to a third embodiment of the present invention.

This system comprises a recording and reproducing apparatus, and a decoder. As shown in FIG. 26, the recording and reproducing apparatus 244 of this recording and reproducing system comprises a secondary data generating circuit 1, formatter 2, error correction encoder 3, recording signal generator 4, recording head 5, magnetic tape 6, reproduction head 7, reproduction signal generator 8, error correction decoder 9, deformatter 10, secondary data decoder 11, system controller 12, switch 13, and high-speed reproduction data output means 240; the decoder 243 comprises a decoder 241 and low-pass filter 242.

The operation of the recording and reproducing apparatus during data reproduction is described first below.

The tape speed during data reproduction is controlled by the system controller 12. The current tape speed, i.e., whether the current reproduction mode is a normal reproduction speed mode or high-speed reproduction mode, is also output from the system controller 12.

During reproduction, the recorded data is reproduced from the magnetic tape 6 by the reproduction head 7, is processed as required for decoding, synchronization address deletion, and other processes by the reproduction signal generator 8, and the processed data is output as the reproduction signal to the error correction decoder 9. The reproduction signal is error corrected by the error correction decoder 9, and is then output to the deformatter 10.

The deformatter 10 first reproduces the flag indicating whether there is any secondary data or not; when this flag indicates that there is secondary data, the deformatter 10 separates and separately outputs the input coded television signal and secondary data.

The decoded data is expanded to the same format as the input coded television signal by the secondary data decoder 11.

The coded television signal and expanded secondary data are switched each frame by the switch 13. Switching is controlled by the system controller 12 and occurs when data loss or errors are likely to occur, such as during high-speed reproduction modes.

The signal selected and output by the switch 13 is then output to the decoder as the reproduced coded television signal.

As a result, images in which each block is flat or which contain only low frequency components and distortion are restored during high-speed reproduction. In addition, information indicating the current reproduction mode to be a high-speed reproduction mode is also output by the high-speed reproduction data output means 240.

The operation of the decoder is described next. The decoder 241 decodes the coded input signal to obtain the decoded image. When information indicating that high-speed reproduction is in progress is input from the high-speed reproduction data output means 240, the low-pass filter 242 filters the decoded image to remove the high frequency component, and thereby reduces the distortion that is apparent in the block. As a result, block distortion during high-speed reproduction can be suppressed by minimizing the increase in the scale of the recording and reproducing apparatus to the addition of only a low-pass filter in the decoder.

It is to be noted that the image quality can be further improved by providing the high-speed reproduction data output means 240 and low-pass filter with such information as the reproduction speed, image resolution, maximum and minimum levels, and the number of secondary data coefficients, to switch filter operation.

By means of a coded television signal recording and reproducing system according to the third embodiment of the invention, it is possible to reduce the block distortion in the reproduced image by the coded television signal recording and reproducing apparatus decoding the data by means of the decoder, and smoothing the decoded image using the smoothing means based on the smoothing request signal during high-speed reproduction.

It is to be noted that while the above embodiments of the invention have been described with reference to a combined recording and reproducing apparatus having both recording and reproducing sections, it will be obvious that the same effect can be achieved by means of independent recording and reproducing devices. Furthermore, while a discrete recording head 5 and reproduction head 7 have been described, it is also possible to use a combined recording/reproducing head.

The switch 13 also switches the coded television signal and secondary data each frame, but may alternatively switch in on-screen block units. Switching is also controlled by the system controller 12 to occur when errors or data loss are likely to occur as during high-speed reproduction, but it is also possible to determine whether an error has occurred in the full frame or part thereof, and substitute the secondary data for that frame or part thereof when it is determined that an error has occurred.

The normal reproduction data and secondary data are also distinguished in the above embodiments, but the secondary data may be compressed data for the normal reproduction, the uncompressed data for the normal reproduction, or a completely different data type. In addition, the intra-frame compressed data is selected by video selector circuit 100 in these embodiments, but the video selector circuit may select another frame.

The secondary data is also recorded as the extracted DC components of each block, but other data may be extracted insofar as it is essential to reproducing the image; an example is the low frequency component of the orthogonal transformation coefficient of each block. In addition, a flag is used to indicate whether secondary data is recorded or not, but the flag may alternatively indicate the type of secondary data, which can then be used to control switching.

In the second embodiment data for normal reproduction is recorded at the beginning of each track, and is followed by recording the secondary data, but the secondary data may be recorded first. Furthermore, the high-speed reproduction speed is described as four times the normal reproduction speed, but may be a higher speed.

Furthermore, while the high-speed reproduction speed is described as four times the normal reproduction speed, the same effect can be obtained if the high-speed reproduction speed is −4 times the normal reproduction speed. When the track pattern is determined as described above, the track pattern is the same during both forward high-speed reproduction and reverse high-speed reproduction.

In addition, the track pattern is determined assuming high-speed reproduction at a fixed 4× the normal track speed, but the track pattern can also be formatted to enable high-speed reproduction at plural high-speed reproduction speeds. A fixed head configuration was also assumed, but the track pattern can also be formatted to enable high-speed reproduction using a head configuration other than that described above.

Plural methods for generating interpolation data were also described in the descriptions of the various formatter embodiments above, but other methods may be alternatively used.

The coded position information and secondary data are also described as detected for each block, but detection may also be applied using other detection units, including units of plural blocks or by each single frame.

In the second embodiment the processed secondary data extracted from the input signal is recorded as the secondary data, but this is essentially the same as recording information input from an external source, including audio signals, text information, or externally generated search data, as the secondary data. In this case, the data is selectively output as secondary data during reproduction by the switch 13.

The related information is also described as indicating the recording capacity of the input signal and the secondary data, but may also record the allocation and position of the recording area. Furthermore, plural candidates can be prepared and appropriately selected for the recording capacity, allocation, and position of the recording areas.

The related information is also recorded to a semiconductor memory device affixed to the tape cassette, but this may not be used depending on the construction of the tape cassette. By recording the related information to the semiconductor memory device, the related information can be easily extracted from the semiconductor memory device, and it is therefore not necessary to extract the related information from the reproduction signal by means of the deformatter 10.

Each track is described as comprising four data areas separated by buffer zones in the descriptions of the error correction encoders above, but the present invention can be applied with no relationship to the specific number of data areas per track or the sequence of areas within the track.

Figure 25:
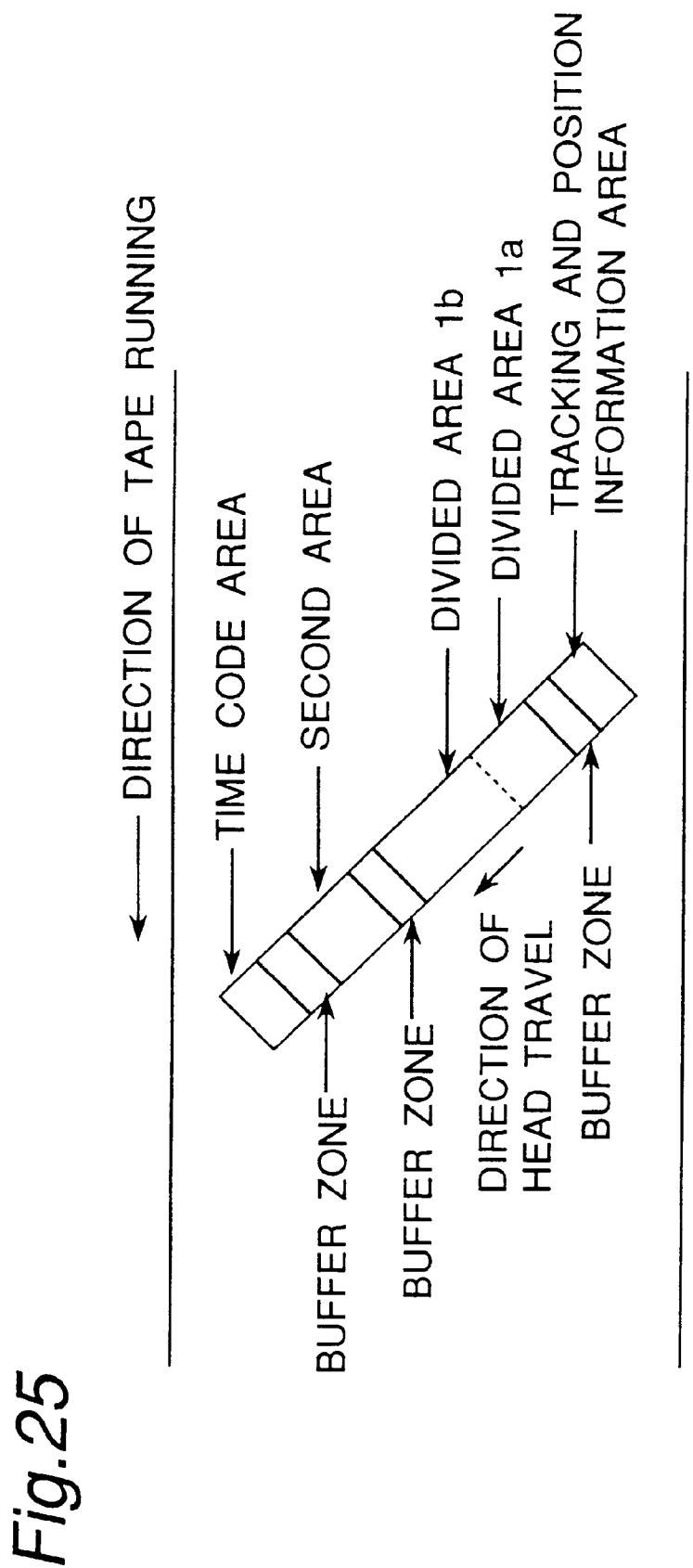
FIG. 25 is a track format suitable for the fourth embodiment of the secondary data decoding means according to the present invention.

Furthermore, each track is described as comprising four data areas separated by buffer zones with the error correction code selected according to the combination of areas, but the same effect can be obtained when each area is further separated into plural subareas and the error correction code is selected according to the combination of subareas. As shown in FIG. 25, the first area in the track format shown in FIG. 13 can be divided into subareas 1*a* and 1*b*, and the error correction code selected according to the combination of these subareas 1*a* and 1*b* and the second area. For example, in an error correction encoder as shown in FIGS. 14 and 16, the data is divided and processed as first area data and second area data. It is also possible to divide and process the data as subarea 1*b* data, and subarea 1*b* and second area data. The method of creating subareas shall not be limited to the preceding description, and any of the areas can be similarly divided. In addition, the number of subareas can any number per area.

The same C1 code is used in the first and second areas in the error correction encoder 24<?>, but the same effect can be obtained using different error correction codes according to the area.

In addition, the first and second input sections are separated above, but a single common input section can be used. The recorded data is also recorded to two areas, the first and second areas, and two modes can be selected, but the number of areas and the number of modes can be increased to three or greater while using the same basic configuration.

Each single track is divided into two areas, the first and second areas, but the invention can still be applied when each track is treated as a unit area.

The error correction code (product code format, selection of each code) and interleave range of the present invention can also be freely selected.

In the fourth embodiment of the secondary data decoder, five DC components are input to the vector quantization means 211, but nine or another number may be used according to the method of generating the code book.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A television signal recording apparatus comprising:
   a related signal extraction means for extracting a related signal which is related to a television signal comprising a video and an audio signal, the related signal extraction means comprises:
   a common information detection means for detecting all or part of common information which is common to the complete sequence of the video signal, common information which is common within each frame, and common information which is common across plural blocks; and
   a related signal selection means for selecting the data required as related signals from the common information in each range detected by the common information detection means,
   flag means for setting a flag indicating whether or not the related signal extracted by said related signal extraction means should be recorded on a recording medium having a plurality of tracks; and
   recording means for recording on said recording medium:
   a) the related signal together with the television signal if the state of said flag indicates the related signal should be recorded; and
   b) the television signal without the related signal if the state of said flag indicates the related signal should not be recorded;
   wherein said recording means records a) said television signal in a first portion of said recording medium relative to movement of said medium, and b) said related signal in a second portion of said recording medium relative to movement of said recording medium, and
   a) wherein said television signal in one of said tracks corresponds to said related signal in more than one of said tracks, and b) said related signal in said more than one of said tracks is derived from the television signal in said one of said tracks.

2. A television signal recording apparatus as claimed in claim 1, wherein the video signal of the television signal is a signal by both intra-frame coding and inter-frame predictive coding, and wherein the related signal extraction means extracts part or all of the data by intra-frame coding in the video signal.

3. A television signal recording apparatus as claimed in claim 2, wherein the related signal extraction means extracts a DC component of an important parts of the frame from the data by at least intra-frame coding.

4. A television signal recording apparatus as claimed in claim 1,
   wherein information related to said related signal is stored in an auxiliary storage medium fitted to a cassette accommodating said recording medium.

5. A television signal recording apparatus according to claim 4, wherein said auxiliary storage medium is an electronic memory.

6. A television signal recording apparatus according to claim 1, wherein at least a portion of said common information is necessary for reproducing said video signal.

7. A television signal recording apparatus according to claim 1, wherein at least a portion of said common information is used for decoding said video signal.

8. A television signal recording apparatus for recording a television signal comprising video and audio signals, said video signal being a signal by both intra-frame coding and inter-frame predictive coding, said television signal recording apparatus comprising:
   a related signal extraction means for extracting part or all of data by said intra-frame coding in said video signal as a related signal;
   flag means for setting a flag indicating whether or not the related signal extracted by said related signal extraction means should be recorded on a recording medium having a plurality of tracks; and
   recording means for recording on said recording medium:
   a) the related signal together with the television signal if the state of said flag indicates the related signal should be recorded; and b) the television signal without the related signal if the state of said flag indicates the related signal should not be recorded;

wherein said recording means records a) said television signal in a first portion of said recording medium relative to movement of said medium, and b) said related signal in a second portion of said recording medium relative to movement of said recording medium, and a) wherein said television signal in one of said tracks corresponds to said related signal in more than one of said tracks, and b) said related signal in said more than one of said tracks is derived from the television signal in said one of said tracks.

9. The television signal recording apparatus as claimed in claim 8, wherein said related signal extraction means comprising:

a common information detection means for detecting all or part of information common to a complete sequence of said video signal, information common within each frame, and information common across plural blocks; and a related signal selection means for selecting data required as said related signal among said common information detected in each range of said complete sequence, said each frame and said plural blocks by said common information detection means.

10. The television signal recording apparatus as claimed in claim 8, further comprising:

means for generating a flag indicative of whether said related signal is recorded on said recording medium.

11. The television signal recording apparatus as claimed in any one of claims 8 to 10, wherein said related signal extracted by said extraction means is a DC component of said data by said intra-frame coding.

12. The television signal recording apparatus as claimed in claim 8, wherein information related to said related signal output from said related signal extraction means is stored in an auxiliary storage means fitted to a cassette accommodating a recording medium.

13. The television signal recording apparatus as claimed in any one of claims 8 to 10, wherein said means for recording records said video signal on a first record region of each track and records said related signal output from said related signal extraction means on a second record region of each track together with information regarding said related signal repeatedly recorded over successive n tracks where n is a positive integer larger than 2.

14. The television signal recording apparatus as claimed in claim 13, wherein the number n is twice the medium speed during a high-speed reproduction mode which is faster than the medium speed during a normal-speed reproduction mode.

15. The television signal recording apparatus as claimed in claim 13, wherein the number n is equal to the medium speed during a high-speed reproduction mode which is faster than the medium speed during a normal-speed reproduction mode.

16. The television signal recording apparatus as claimed in claim 13, further comprising a recording control means for varying the recording capacity of each of said first and second regions wherein said means for recording further records information regarding the respective recording capacity controlled by said recording control means.

17. A television signal reproducing apparatus for reproducing a television signal having been recorded on a recording medium using a television signal recording apparatus as claimed in claim 8, comprising:

a signal reproduction means for reproducing information data having been recorded on the recording medium to provide a reproduction signal;

a first extraction means for extracting the television signal from said reproduction signal;

a second extraction means for extracting information regarding a related signal of said television signal having been recorded from said reproduction signal;

a third extraction means for extracting said related signal of said television signal based on said information extracted by said second extraction means; and an output selection means for selecting and outputting either an output of said first extraction means or an output of said third extraction means.

18. The television signal reproducing apparatus as claimed in claim 17, wherein said output selection means comprises:

a selection means operable to select the output of said third extraction means only when the information regarding the related signals of the television signal indicate the related signal of said television signal have been recorded, and an output means for outputting an output of the selection means.

19. The television signal reproducing apparatus as claimed in claim 17, further comprising:

a coded position information detection means for obtaining a coded position information, which identifies the position on a screen, for each part of said related signal reproduced from said recording medium;

a data deletion means for deleting part of said reproduced related signal so that there is no duplication of data for the same position on the screen when there are related signals having parts occupying the same position on the screen; and a data storing means for sequencing the related signals from which data has been deleted by the data deletion means.

20. The television signal reproducing apparatus as claimed in claim 17, further comprising:

a coded position information detection means for obtaining a coded position information, which identifies the position on a screen, for each part of said related signal reproduced from said recording medium;

an unprocessed position detection means for detecting the unprocessed positions, which are the positions not reproduced on the screen when said related signal is decoded;

a coded data generating means for generating coding data used to decode said unprocessed positions, and adding coding data to said related signal; and a data sorting means for sequencing the related signal to which data was added by the coded data generating means in the order of receipt.

21. The television signal reproducing apparatus as claimed in claim 17, further comprising:

a coded signal generating means for generating a new coded signal of each block in addition to the reproduced signal from DC components of each block and surrounding blocks in the related signal reproduced from said recording medium.

22. The television signal reproducing apparatus as claimed in claim 21, wherein said coded signal generating means comprising:

an interpolated image generating means for obtaining an interpolated image signal by interpolating the pixels in each block from the DC components of each block and the surrounding blocks in the related signal reproduced from the recording medium; and a coding means for obtaining a coded signal by coding the interpolated image signal.

23. The television signal reproducing apparatus as claimed in claim 21, wherein said coded signal generating means comprising:

an interpolated image transformation coefficient generating means for obtaining an orthogonal transformation coefficient by applying an orthogonal transform to an interpolated image signal, which is obtained by interpolating the component in each block of the related signal reproduced from the recording medium is taken as a pixel value and further comprising an encoding means for encoding the blocks in a unit to provide a reduced image encoding signal.

24. The television signal reproducing apparatus as claimed in claim 21, wherein said coded signal generating means comprising:

an interpolated image coding signal storage means for relating the values of the DC components of each block and surrounding blocks to an interpolated image coding signal, and pre-storing the relationship information; and a coding means for obtaining a coded interpolation signal equivalent to the coded signal of the interpolated images of each block based on the relationship information of the interpolated image coding signal storage means from the DC components of each block and the surrounding blocks in said related signal reproduced from the recording medium.

25. The television signal reproducing apparatus as claimed in claim 17, further comprising:

a fourth extraction means for extracting information associated with a capacity related to a recording capacity of each of first and second record regions based on said reproduction signal;

a recording capacity calculating means for providing information associated with the recording capacity based on an output from the fourth extraction means; and a fifth extraction means for extracting a first reproduction signal from a part of said reproduction signal, recorded in the first record region, and also a second reproduction signal from a remaining part of said reproduction signal recorded in the second record region, on the basis of an output from said recording capacity calculating means.

26. The television signal reproducing apparatus as claimed in claim 17, wherein the value of the direct current component in each block of the related signal reproduced from the recording medium is taken as a pixel value and further comprising an encoding means for encoding the blocks in a unit to provide a reduced image encoding signal.

* * * * *

UNITED STATES PATENT AND TRADEMARK OFFICE
CERTIFICATE OF CORRECTION

| | |
|---|---|
| PATENT NO. | : 6,031,959 |
| DATED | : February 29, 2000 |
| INVENTOR(S) | : Hamai et al. |

Page 1 of 1

It is certified that error appears in the above-identified patent and that said Letters Patent is hereby corrected as shown below:

<u>Title page,</u>
Item [56], References Cited, OTHER PUBLICATIONS, insert:
-- European Search Report dated 6/15/95
European Search Report dated 8/11/95 --

<u>Column 24,</u>
Line 18, between "said" and "medium" insert -- recording --.

<u>Column 25,</u>
Line 6, between "said" and "medium" insert -- recording --.

Signed and Sealed this

Nineteenth Day of March, 2002

*Attest:*

*Attesting Officer*

JAMES E. ROGAN
*Director of the United States Patent and Trademark Office*